United States Patent
Kusaka

(10) Patent No.: US 7,751,700 B2
(45) Date of Patent: Jul. 6, 2010

(54) FOCUS ADJUSTMENT DEVICE, IMAGING DEVICE AND FOCUS ADJUSTMENT METHOD

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 378 days.

(21) Appl. No.: 11/698,181

(22) Filed: Jan. 26, 2007

(65) Prior Publication Data
US 2007/0206940 A1    Sep. 6, 2007

(30) Foreign Application Priority Data

Mar. 1, 2006   (JP) .............................. 2006-054491
Mar. 1, 2006   (JP) .............................. 2006-054492

(51) Int. Cl.
G03B 17/00   (2006.01)
G03B 13/00   (2006.01)
H04N 5/232   (2006.01)

(52) U.S. Cl. .................. 396/79; 396/80; 396/111; 396/113; 396/114; 396/119; 396/128; 348/345; 348/349; 348/350

(58) Field of Classification Search .................. 396/79, 396/80, 111, 113, 114, 119, 128; 348/345, 348/349, 350
See application file for complete search history.

(56) References Cited

U.S. PATENT DOCUMENTS

| | | | | |
|---|---|---|---|---|
| 5,359,383 A | * | 10/1994 | Miida et al. .................. | 396/128 |
| 6,453,124 B2 | | 9/2002 | Morimoto et al. | |
| 6,781,632 B1 | * | 8/2004 | Ide .............................. | 348/345 |
| 6,816,199 B1 | * | 11/2004 | Ide .............................. | 348/350 |
| 6,826,363 B2 | * | 11/2004 | Taka .......................... | 396/125 |
| 6,897,899 B1 | * | 5/2005 | Ide et al. ..................... | 348/350 |
| 2004/0179128 A1 | * | 9/2004 | Oikawa ....................... | 348/345 |
| 2005/0191047 A1 | * | 9/2005 | Toji ............................. | 396/111 |

FOREIGN PATENT DOCUMENTS

| JP | A 2001-281530 | 10/2001 |
|---|---|---|
| JP | A 2004-144939 | 5/2004 |

* cited by examiner

Primary Examiner—W. B. Perkey
Assistant Examiner—Noam Reisner
(74) Attorney, Agent, or Firm—Oliff & Berridge, PLC

(57) ABSTRACT

A focus adjustment device includes an image sensor that includes imaging pixels for capturing an image formed via an imaging optical system and focus detection pixels for detecting a focus adjustment state at the imaging optical system through a first pupil division-type image shift detection method, a focus detector that detects a focus adjustment state at the imaging optical system through a second pupil division-type image shift detection method different from the first pupil division-type image shift detection method, and a focus adjustment controller that executes focus adjustment for the imaging optical system based upon the focus adjustment states detected by the image sensor and the focus detector.

2 Claims, 20 Drawing Sheets

FOCUS ADJUSTMENT DEVICE, IMAGING DEVICE AND FOCUS ADJUSTMENT METHOD

INCORPORATION BY REFERENCE

The disclosures of the following priority applications are herein incorporated by reference:
Japanese Patent Application No. 2006-54491 filed Mar. 1, 2006
Japanese Patent Application No. 2006-54492 filed Mar. 1, 2006

BACKGROUND OF THE INVENTION

1. Field of the Invention

The present invention relates to a device that adjusts the focus of an imaging optical system, an imaging device equipped with the focus adjustment device and a focus adjustment method.

2. Description of the Related Art

There is a digital camera known in the related art (see Japanese Laid Open Patent Publication No. 2001-281530) that includes a focus detection sensor adopting a phase difference detection method and an image sensor. This digital camera first drives the imaging optical system to a point near the focus match position based upon the results of detection executed by the focus detection sensor, then detects the focus match position through a contrast detection method by using the output from the image sensor and executes fine adjustment to the focus match position.

However, the contrast detection method and the phase difference detection method adopted in the camera in the related art described above are not perfectly compatible with each other since their focus detection principles are different and, for this reason, the correspondence of the focus detection results obtained through the two methods tends to be poor. For instance, there may be a photographic subject for which the focus can be detected successfully through the phase difference detection method but the focus detection cannot be executed successfully through the contrast detection method. In addition, while the focus may be detected with a high level of accuracy through the phase difference detection method for a given photographic subject, the accuracy of the focus detection for the same photographic subject executed through the contrast detection method may be poor. Under such circumstances, the imaging optical system may hunt for, and fail to reach the focus match point, the imaging optical system may be driven to an unexpected position or the imaging optical system may not move at all when the camera attempts to fine-adjust the position of the imaging optical system through the contrast detection method after driving the lens to a point near the focus match position through the phase difference detection method.

SUMMARY OF THE INVENTION

According to the 1st aspect of the invention, a focus adjustment device comprises an image sensor that includes imaging pixels for capturing an image formed via an imaging optical system and focus detection pixels for detecting a focus adjustment state at the imaging optical system through a first pupil division-type image shift detection method, a focus detector that detects a focus adjustment state at the imaging optical system through a second pupil division-type image shift detection method different from the first pupil division-type image shift detection method, and a focus adjustment controller that executes focus adjustment for the imaging optical system based upon the focus adjustment states detected by the image sensor and the focus detector.

According to the 2nd aspect of the invention, a focus adjustment device comprises an image sensor that includes imaging pixels for capturing an image formed via an imaging optical system and focus detection pixels for detecting a focus adjustment state at the imaging optical system through a first processing process, a focus detector that detects a focus adjustment state at the imaging optical system through a second processing process different from the first processing process, and a focus adjustment controller that executes focus adjustment for the imaging optical system based upon the focus adjustment states detected by the image sensor and the focus detector.

The focus adjustment device may further comprise an optical element capable of directing a light flux from the imaging optical system along a light path extending toward the image sensor and along a light path extending toward the focus detector.

The image sensor may include the imaging pixels and the focus detection pixels disposed on a single substrate.

The focus detection pixels may each include a micro-lens and a pair of photoelectric conversion units provided in correspondence to the micro-lens.

The focus detector may include a pair of re-focusing lenses for reforming an image formed at a predetermined image plane of the imaging optical system and an image sensor that detects images reformed via the pair of re-focusing lenses.

A range of focus adjustment state detection achieved through the second image shift detection method may be greater than a range of focus adjustment state detection achieved through the first image shift detection method.

A range of focus adjustment state detection achieved through the second processing process may be greater than a range of focus adjustment state detection achieved through the first processing process.

A threshold value used in the second image shift detection method as to whether or not a detection of the focus adjustment state is possible may be greater than a threshold value used in the first image shift detection method as to whether or not detection of the focus adjustment state is possible.

A threshold value used in the second processing process as to whether or not a detection of the focus adjustment state is possible may be greater than a threshold value used in the first processing process as to whether or not detection of the focus adjustment state is possible.

According to the 4th aspect of the invention, a focus adjustment device comprises an image sensor that includes imaging pixels for capturing an image formed via an imaging optical system and focus detection pixels for detecting a focus adjustment state at the imaging optical system, a focus detector that detects a focus adjustment state at the imaging optical system, and a focus adjustment controller that executes focus adjustment for the imaging optical system based upon the focus adjustment states detected by the image sensor and the focus detector. The focus adjustment controller executes focus adjustment based upon the focus adjustment state detected by the focus detector when the focus adjustment state indicates a value greater than a predetermined value and executes focus adjustment based upon the focus adjustment state detected by the image sensor when the focus adjustment state indicates a value smaller than the predetermined value.

According to the 5th aspect of the invention, a focus adjustment device comprises an image sensor that includes imaging pixels for capturing an image formed via an imaging optical system and focus detection pixels for detecting a focus adjustment state at the imaging optical system, a focus detector that detects a focus adjustment state at the imaging optical system, and a focus adjustment controller that executes focus adjustment for the imaging optical system based upon the focus adjustment states detected by the image sensor and the focus detector. A range over which the focus adjustment state detected by the focus detector is judged to be in focus is wider than a range over which the focus adjustment state detected by the image sensor is judged to be in focus.

The focus adjustment device may further comprise an imaging controller that controls a start and an end of an imaging operation executed to capture an image obtained via the image sensor.

The focus adjustment controller may execute focus adjustment for the imaging optical system based upon the focus adjustment state detected by the focus detector until the imaging operation is started by the imaging controller, and execute focus adjustment for the imaging optical system based upon the focus adjustment state detected by the image sensor once the imaging operation starts.

According to the 6th aspect of the invention, a focus adjustment device comprises an image sensor that includes imaging pixels for capturing an image formed via an imaging optical system and focus detection pixels for detecting a defocus amount indicating an extent of defocusing manifesting at the imaging optical system through a pupil division-type method, a focus detector that detects a focus adjustment state at the imaging optical system through a pupil division-type method, a focus adjustment controller that executes focus adjustment for the imaging optical system based upon the focus adjustment states detected by the image sensor and the focus detector, and a corrector that corrects the defocus amount detected by the focus detector by adding an offset thereto so as to equalize the defocus amount with the defocus amount detected by the image sensor.

The offset may represent a difference between the defocus amount detected by the image sensor and the defocus amount detected by the focus detector in correspondence to a single photographic subject.

The offset can be set in correspondence to optical characteristics of the imaging optical system, and can be set in correspondence to a minimum f-number of the imaging optical system.

The focus adjustment device may further comprise a storage device that stores the offset. In this case, the focus adjustment controller can update the offset based upon the defocus quantities detected by the image sensor and the focus detector.

The image sensor and the focus detector may each detect the defocus amount over a plurality of focus detection areas corresponding to a plurality of positions set on an estimated focus plane of the imaging optical system. The focus detection controller can select one of the focus detection areas based upon the defocus amount detected by the focus detector and execute focus adjustment for the imaging optical system based upon the defocus amount detected by the image sensor in correspondence to the selected focus detection area.

According to the 7th aspect of the invention, an imaging device comprises an image sensor that includes imaging pixels for capturing an image formed via an imaging optical system and focus detection pixels for detecting a focus adjustment state at the imaging optical system based upon a shift amount between a pair of images formed with light fluxes passing through a pair of areas on a pupil of the imaging optical system, a focus detector that detects a focus adjustment state at the imaging optical system based upon a shift amount between a pair of images formed with light fluxes passing through a pair of areas on a pupil of the imaging optical system, and a focus adjustment controller that executes focus adjustment for the imaging optical system based upon the focus adjustment state detected by the image sensor or the focus detector selected in correspondence to photographic conditions.

The imaging device may further comprise an optical element capable of directing a light flux from the imaging optical system along a light path extending toward the image sensor and along a light path extending toward the focus detector.

The image sensor in the imaging device may include the imaging pixels and the focus detection pixels disposed on a single substrate.

The focus detection pixels may each include a micro-lens and a pair of photoelectric conversion units provided in correspondence to the micro-lens.

The focus detector may include a pair of secondary focusing lens/re-focusing lens for reforming an image formed at a predetermined image plane of the imaging optical system and an image sensor that detects images reformed via the pair of re-focusing lenses.

According to the 8th aspect of the invention, an imaging device comprise an image sensor that includes imaging pixels for capturing an image formed via an imaging optical system and focus detection pixels for detecting a focus adjustment state at the imaging optical system based upon a shift amount between a pair of images formed with light fluxes passing through a pair of areas on a pupil of the imaging optical system, a focus detector that detects the focus adjustment state at the imaging optical system based upon a shift amount between a pair of images formed with light fluxes passing through a pair of areas on a pupil of the imaging optical system, and a focus adjustment controller that executes focus adjustment for the imaging optical system based upon the focus adjustment state detected by one of the image sensor and the focus detector selected in correspondence to photographic conditions. The focus adjustment controller executes focus adjustment for the imaging optical system based upon the focus adjustment state detected by the focus detector until an imaging operation starts and executes focus adjustment for the imaging optical system based upon the focus adjustment state detected by the image sensor once the imaging operation starts.

According to the 9th aspect of the invention, an imaging device comprises an image sensor that includes imaging pixels for capturing an image formed via an imaging optical system and focus detection pixels for detecting a focus adjustment state at the imaging optical system based upon a shift amount between a pair of images formed with light fluxes passing through a pair of areas on a pupil of the imaging optical system, a focus detector that detects the focus adjustment state at the imaging optical system based upon a shift amount between a pair of images formed with light fluxes passing through a pair of areas on the pupil of the imaging optical system, and a focus adjustment controller that executes focus adjustment for the imaging optical system based upon the focus adjustment state detected by one of the image sensor and the focus detector selected in correspondence to photographic conditions. The focus adjustment controller executes focus adjustment for the imaging optical system based upon the focus adjustment state detected by the focus detector while a continuous shooting is in progress.

According to the 10th aspect of the invention, an imaging device comprises an image sensor that includes imaging pixels for capturing an image formed via an imaging optical system and focus detection pixels for detecting a focus adjustment state at the imaging optical system based upon a shift amount between a pair of images formed with light fluxes passing through a pair of areas on a pupil of the imaging optical system, a focus detector that detects a focus adjustment state at the imaging optical system based upon a shift amount between a pair of images formed with light fluxes passing through a pair of areas on a pupil of the imaging optical system, and a focus adjustment controller that executes focus adjustment for the imaging optical system based upon the focus adjustment state detected by one of the image sensor and the focus detector selected in correspondence to photographic conditions. The focus adjustment controller executes focus adjustment for the imaging optical system based upon the focus adjustment state detected by the focus detector while a movie shooting is in progress.

The focus adjustment controller may execute focus adjustment for the imaging optical system based upon the focus adjustment state detected by the image sensor while a continuous shooting is in progress with the light path of the imaging optical system directed toward the image sensor by the optical element.

The focus adjustment controller may execute focus adjustment for the imaging optical system based upon the focus adjustment state detected by the image sensor while a movie shooting is in progress with the light path of the imaging optical system directed toward the image sensor by the optical element.

The focus adjustment controller may execute focus adjustment based upon the focus adjustment state detected by the focus detector when detecting the focus adjustment state in a plurality of focus detection areas corresponding to a plurality of positions set on a predetermined image plane of the imaging optical system, and execute focus adjustment based upon the focus adjustment state detected by the image sensor when detecting the focus adjustment state in one of the plurality of focus detection areas.

The focus adjustment controller may execute focus adjustment based upon the focus adjustment state detected by the focus detector when continuously executing the focus adjustment after the imaging optical system is in focus, and execute focus adjustment based upon the focus adjustment state detected by the image sensor if the focus adjustment is disallowed once the imaging optical system is in focus.

The imaging device may further comprise a display at which the focus adjustment state detected by the image sensor is indicated when focus adjustment is manually executed.

The imaging device may further comprise a monitor at which an image captured by the image sensor is displayed. In this case, the focus adjustment controller can execute focus adjustment based upon the focus adjustment state detected by the image sensor when magnifying and displaying the image captured by the image sensor at the monitor, and execute focus adjustment based upon the focus adjustment state detected by the focus detector when reducing and displaying the image at the monitor.

According to the 11th aspect of the invention, an imaging device comprises an image sensor that includes imaging pixels for capturing an image formed via an imaging optical system and focus detection pixels for detecting a focus adjustment state at the imaging optical system based upon a shift amount between a pair of images formed with light fluxes passing through a pair of areas on a pupil of the imaging optical system, a focus detector that detects a focus adjustment state at the imaging optical system based upon a shift amount between a pair of images formed with light fluxes passing through a pair of areas on the pupil of the imaging optical system, and a focus adjustment controller that executes focus adjustment for the imaging optical system based upon the focus adjustment state detected by one of the image sensor and the focus detector selected in correspondence to photographic conditions. The focus adjustment controller executes focus adjustment based upon the focus adjustment state detected by the image sensor when a minimum f-number of the imaging optical system indicates a level brighter than a level corresponding to a predetermined value, and executes focus adjustment based upon the focus adjustment state detected by the focus detector when the minimum f-number indicates a level darker than the level corresponding to the predetermined value.

The focus adjustment controller may execute focus adjustment based upon the focus adjustment state detected by the image sensor when an aperture value used to control the image optical system indicates a level brighter than a level corresponding to a predetermined value, and execute focus adjustment based upon the focus adjustment state detected by the focus detector when the aperture used to control the imaging optical system indicates a level darker than the level corresponding to the predetermined value.

The focus adjustment controller may execute focus adjustment based upon the focus adjustment state detected by the image sensor when a focal length of the imaging optical system is smaller than a predetermined value, and execute focus adjustment based upon the focus adjustment state detected by the focus detector when the focal length is greater than the predetermined value.

The focus adjustment controller may execute focus adjustment based upon the focus adjustment state detected by the image sensor when an exposure time set for an imaging operation executed at the image sensor is shorter than a predetermined length of time, and execute focus adjustment based upon the focus adjustment state detected by the focus detector when the exposure time is longer than the predetermined length of time.

The focus adjustment controller may execute focus adjustment based upon the focus adjustment state detected by the image sensor when a sensitivity is lower than a predetermined value, and execute focus adjustment based upon the focus adjustment state detected by the focus detector if the sensitivity is higher than the predetermined value.

The focus adjustment controller may execute focus adjustment based upon the focus adjustment state detected by the image sensor when a photographic subject is not illuminated during a photographing operation, and execute focus adjustment based upon the focus adjustment state detected by the focus detector when the photographic subject is illuminated during the photographing operation.

The focus adjustment controller may execute focus adjustment based upon the focus adjustment state detected by the image sensor when a self-timer photographing mode is selected, and execute focus adjustment based upon the focus adjustment state detected by the focus detector when the self-timer photographing mode is not selected.

The focus adjustment controller may execute focus adjustment based upon the focus adjustment state detected by the image sensor when the imaging device is set at a fixed position, and execute focus adjustment based upon the focus adjustment state detected by the focus detector when the imaging device is not fixed.

The focus adjustment controller may execute focus adjustment based upon the focus adjustment state detected by the image sensor when a mode for photographing a stationary subject is set, and execute focus adjustment based upon the focus adjustment state detected by the focus detector when a mode for photographing a moving subject is set.

According to the 12th aspect of the invention, an imaging device comprises an image sensor that includes imaging pixels for capturing an image formed via an imaging optical system and focus detection pixels for detecting a focus adjustment state at the imaging optical system based upon a shift amount between a pair of images formed with light fluxes passing through a pair of areas on a pupil of the imaging optical system, a focus detector that detects a focus adjustment state at the imaging optical system based upon a shift amount between a pair of images formed with light fluxes passing through a pair of areas on a pupil of the imaging optical system, and a focus adjustment controller that executes focus adjustment for the imaging optical system based upon the focus adjustment state detected by one of the image sensor and the focus detector selected in correspondence to photographic conditions. The focus adjustment controller executes focus adjustment based upon the focus adjustment state detected by the focus detector when the focus adjustment state indicates a value greater than a predetermined value, and executes focus adjustment based upon the focus adjustment state detected by the image sensor when the focus adjustment state indicates a value smaller than the predetermined value.

The focus adjustment controller may execute focus adjustment based upon the focus adjustment state detected by the image sensor when a brightness in an image field is higher than a predetermined value, and execute focus adjustment based upon the focus adjustment state detected by the focus detector when the brightness in the image field is lower than the predetermined value.

The imaging device may further comprise a judging circuit that judges as to whether a photographic subject is stationary or moving. In this case, the focus adjustment controller may execute focus adjustment based upon the focus adjustment state detected by the image sensor if the judging circuit determines that the photographic subject is stationary, and execute focus adjustment based upon the focus adjustment state detected by the focus detector if the judging circuit determines that the photographic subject is moving.

The focus adjustment controller may execute focus adjustment based upon the focus adjustment state detected by the image sensor when no auxiliary light is radiated for focus detection, and executes focus adjustment based upon the focus adjustment state detected by the focus detector when the auxiliary light is radiated.

According to the 13th aspect of the invention, a focus adjustment method comprises providing an image sensor that includes imaging pixels for capturing an image formed via an imaging optical system and focus detection pixels for detecting a focus adjustment state at the imaging optical system through a first processing process, providing a focus detector that detects a focus adjustment state at the imaging optical system through a second processing process different from the first processing process, and executing focus adjustment for the imaging optical system based upon the focus adjustment states detected by the image sensor and the focus detector.

According to the 14th aspect of the invention, a focus adjustment method comprises providing an image sensor that includes imaging pixels for capturing an image formed via an imaging optical system and focus detection pixels for detecting a focus adjustment state at the imaging optical system, providing a focus detector that detects a focus adjustment state at the imaging optical system, and executing focus adjustment for the imaging optical system based upon the focus adjustment states detected by the image sensor and the focus detector. Focus adjustment is executed based upon the focus adjustment state detected by the focus detector when the focus adjustment state indicates a value greater than a predetermined value and focus adjustment is executed based upon the focus adjustment state detected by the image sensor when the focus adjustment state indicates a value smaller than the predetermined value.

According to the 15th aspect of the invention, an imaging method comprising providing an image sensor that includes imaging pixels for capturing an image formed via an imaging optical system and focus detection pixels for detecting a focus adjustment state at the imaging optical system based upon a shift amount between a pair of images formed with light fluxes passing through a pair of areas on a pupil of the imaging optical system, providing a focus detector that detects a focus adjustment state at the imaging optical system based upon a shift amount between a pair of images formed with light fluxes passing through a pair of areas on a pupil of the imaging optical system, and executing focus adjustment for the imaging optical system based upon the focus adjustment state detected by one of the image sensor and the focus detector selected in correspondence to photographic conditions.

According to the 16th aspect of the invention, an imaging method comprises providing an image sensor that includes imaging pixels for capturing an image formed via an imaging optical system and focus detection pixels for detecting a focus adjustment state at the imaging optical system based upon a shift amount between a pair of images formed with light fluxes passing through a pair of areas on a pupil of the imaging optical system, providing a focus detector that detects a focus adjustment state at the imaging optical system based upon a shift amount between a pair of images formed with light fluxes passing through a pair of areas on a pupil of the imaging optical system, and executing focus adjustment for the imaging optical system based upon the focus adjustment state detected by one of the image sensor and the focus detector selected in correspondence to photographic conditions. Focus adjustment for the imaging optical system is executed based upon the focus adjustment state detected by the focus detector until an imaging operation starts, and focus adjustment for the imaging optical system is executed based upon the focus adjustment state detected by the image sensor once the imaging operation starts.

DETAILED DESCRIPTION OF THE PREFERRED EMBODIMENTS

An explanation is now given on the focus detection device according to the present invention and a digital still camera representing an example of an imaging device equipped with the focus detection device.

Figure 1:
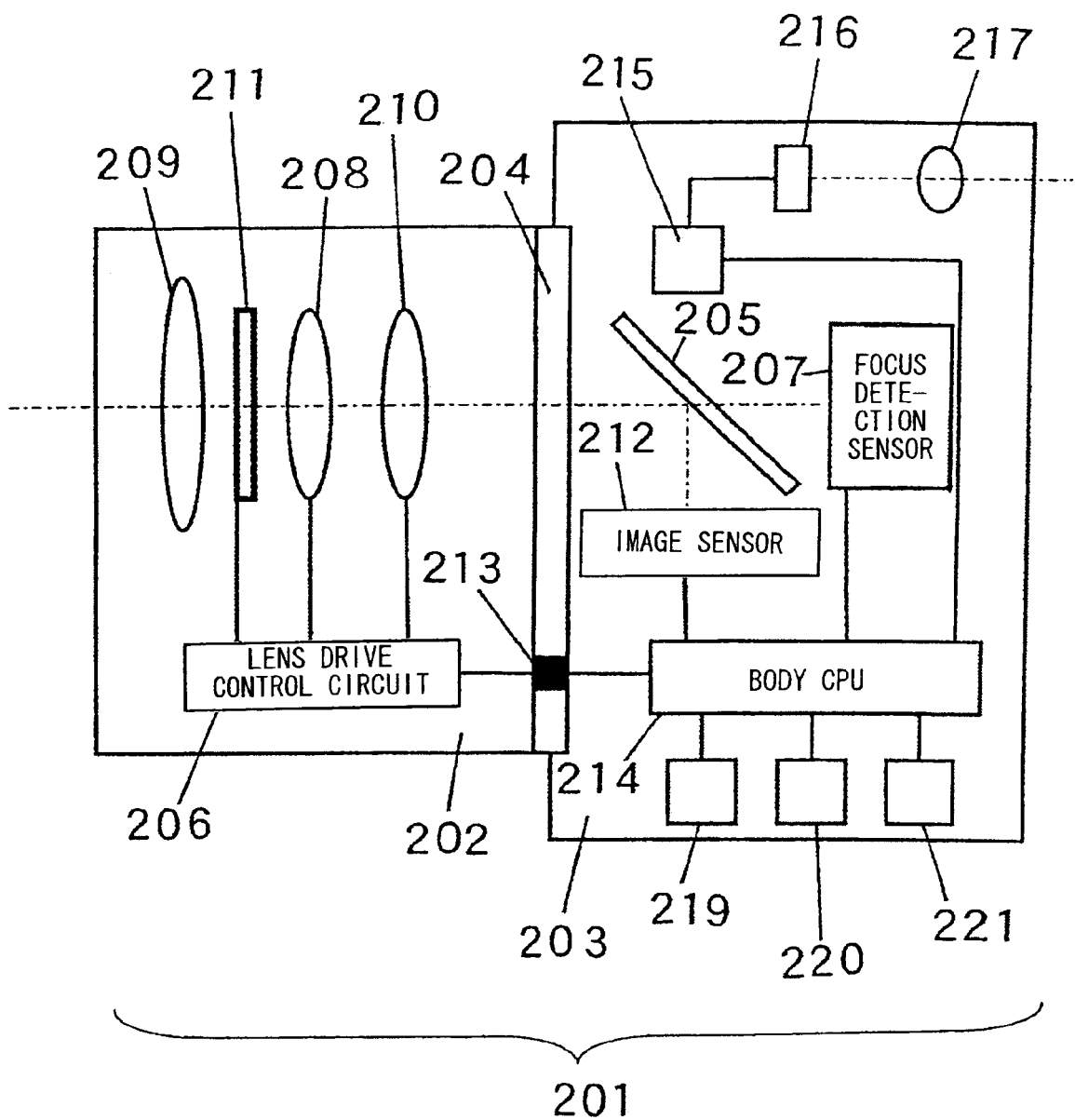
FIG. 1 shows the structure adopted in the digital still camera in an embodiment.

FIG. 1 shows the structure adopted in the digital still camera in an embodiment. A digital still camera 201 comprises an exchangeable lens 202 and a camera body 203. The exchangeable lens 202 is mounted at the camera body 203 via a mount unit 204.

The exchangeable lens 202 includes an objective lens 209, a zooming lens 208, a focusing lens 210, an aperture 211 and a lens drive control circuit 206. The lens drive control circuit 206, which includes a CPU and a drive circuit (neither shown), controls the drive of the focusing lens 210 and the aperture 211, detects the states of the zooming lens 208, the focusing lens 210 and the aperture 211, and exchanges lens information and focus adjustment information by communicating with a body CPU 214 to be detailed later.

In the camera body 203, a half mirror 205, a focus detection sensor 207, an image sensor 212, the body CPU 214, an LCD driver 215, an LCD 216, an eyepiece lens 217, a memory card 219, a drive control circuit 220, an external operation member 221 and the like are installed.

At the half mirror 205 disposed on the optical axis of the exchangeable lens 202, a light path is split to a reflection-side path and a transmission-side path. A half mirror function of the half mirror 205 is achieved by forming a reflecting film over the front surface of a glass plate with a predetermined thickness, with an anti-reflection film formed over the rear surface of the glass plate. The focus detection sensor 207, disposed on the transmission side path from the half mirror 205 at an estimated focus plane (predetermined image forming plane) of the exchangeable lens 202 has a function of detecting the focus of the exchangeable lens 202. The focus detection sensor 207 includes a plurality of built-in focus detection units (not shown) adopting an image reformation method, so as to execute focus detection at a plurality of focus detection positions.

The image sensor 212 disposed on the reflection-side path from the half mirror 205 at an estimated focus plane of the exchangeable lens 202, has a function of detecting the focus of the exchangeable lens 202 and an imaging function.

The image sensor 212 includes two-dimensionally arrayed imaging pixels and a row of focus detection pixels set in the imaging pixel array over areas corresponding to a plurality of focus detection positions.

In this specification, the focus adjustment executed for the focusing lens 210 based upon the focus detection results provided by the focus detection sensor 207 is referred to as "exclusive AF" or "image reformation method AF", since the focus is adjusted via the special focus detection sensor exclusively used for focus detection. In addition, the focus adjustment executed for the focusing lens 210 based upon the focus detection results obtained from the focus detection pixel rows at the image sensor 212 is referred to as "image sensor AF" or "micro-lens method AF" since the focus is adjusted via the image sensor in this case.

The body CPU 214 controls the read operation executed to read out the outputs from the image sensor 212 and the focus detection sensor 207, communicates with the lens drive control circuit 206 (to exchange the lens information/focus adjustment information), controls the switch-over from the image sensor 212 to the focus detection sensor 207 and vice versa when adjusting the focus for the exchangeable lens 202, controls the focus detection and the focus adjustment for the exchangeable lens 202, controls the imaging operation executed to capture an image, and controls the overall operations of the digital still camera. The body CPU 214 and the lens drive control circuit 206 exchange various types of information, such as the lens information and information indicating the defocus amount based upon which the focusing lens is driven, via an electrical contact point portion 213 present at the mount unit 204.

The LCD 216 functions as a liquid crystal viewfinder (EVF: electronic viewfinder). The LCD driver 215 drives the LCD 216 to display a captured image or various types of information including photographic conditions. The photographer is able to see such information via the eyepiece lens 217. The memory card 219 is used as an image storage area in which image signals are stored. The drive control circuit 220 includes circuits engaged in operation to control the camera, such as a timer. In addition, the external operation member 221 includes operating members operated to perform various types of operations and select various settings, such as a shutter button, in the digital camera.

A subject image formed on the image sensor 202, after passing through the exchangeable lens 202 and being reflected at the half mirror 205, then undergoes photoelectric conversion at the image sensor 212. Signals resulting from the photoelectric conversion are then transmitted to the body CPU 214. A subject image formed on the focus detection sensor 207, after passing through the exchangeable lens 202 and being transmitted through the half mirror 205, on the other hand, undergoes photoelectric conversion at an image sensor built into the focus detection sensor 207. The signals resulting from the photoelectric conversion at the image sensor are then transmitted to the body CPU 214.

The body CPU 214 executes focus detection calculation based upon the output from the focus detection pixel row at the image sensor 212 and the output from the focus detection sensor 207 and determines the state of the focus adjustment achieved with regard to the image formed on the image sensor 212 via the exchangeable lens 202, i.e., determines the defocus amount indicating the extent of defocusing. The defocus amount thus calculated is provided to the lens drive control circuit 206. In addition, the body CPU 214 stores image signals generated based upon the outputs from the imaging pixels into the memory card 219, and also determines through an arithmetic operation the brightness of the photographic field by photometering the photographic field based upon the outputs from the imaging pixels and the focus detection pixels. The body CPU 214 also transmits the image signals to the LCD driver 215, which then displays the image at the LCD 216. Furthermore, in response to signals from the drive control circuit 220, the body CPU 214 effects switch-overs for various types of control or starts up any of the various types of control. It also effects switch-overs for the various types of control in response to switching operations performed at the external operation member 221 or in correspondence to the specific operational status assumed at the external operation member 221.

The CPU (not shown) in the lens drive control circuit 206 adjusts the lens information in correspondence to the current focusing state, zooming state, aperture setting state and the like. More specifically, it monitors the positions of the zooming lens 208 and the focusing lens 210 and the position of the aperture 211, and calculates correct lens information based upon the monitored information. Alternatively, it may select the lens information corresponding to the monitored information from a lookup table prepared in advance. In addition, the lens drive control circuit 206 calculates a lens drive quantity indicating the extent to which the lens is to be driven based upon the defocus amount having been received and drives the focusing lens 210 to a focus match point based upon the lens drive quantity.

The following advantages are achieved by adopting the structure shown in FIG. 1 in the digital camera in the embodiment with the image sensor 212 disposed on the reflection side of the half mirror 205 and the focus detection sensor 207 disposed on the transmission side of the half mirror 205. Namely, since the half mirror 205 does not need to retreat for each imaging operation, quick response is assured when capturing an image, which allows the photographer to make the most of a good photo opportunity with a high level of reliability. In addition, since the quality of the captured image is not lowered due to aberration deterioration as the image is transmitted through the half mirror 205, a higher-quality image compared to the image captured on the transmission side, can be captured at the image sensor. Moreover, the focus can be adjusted through the exclusive AF concurrently while the imaging operation is in progress.

Figure 2:
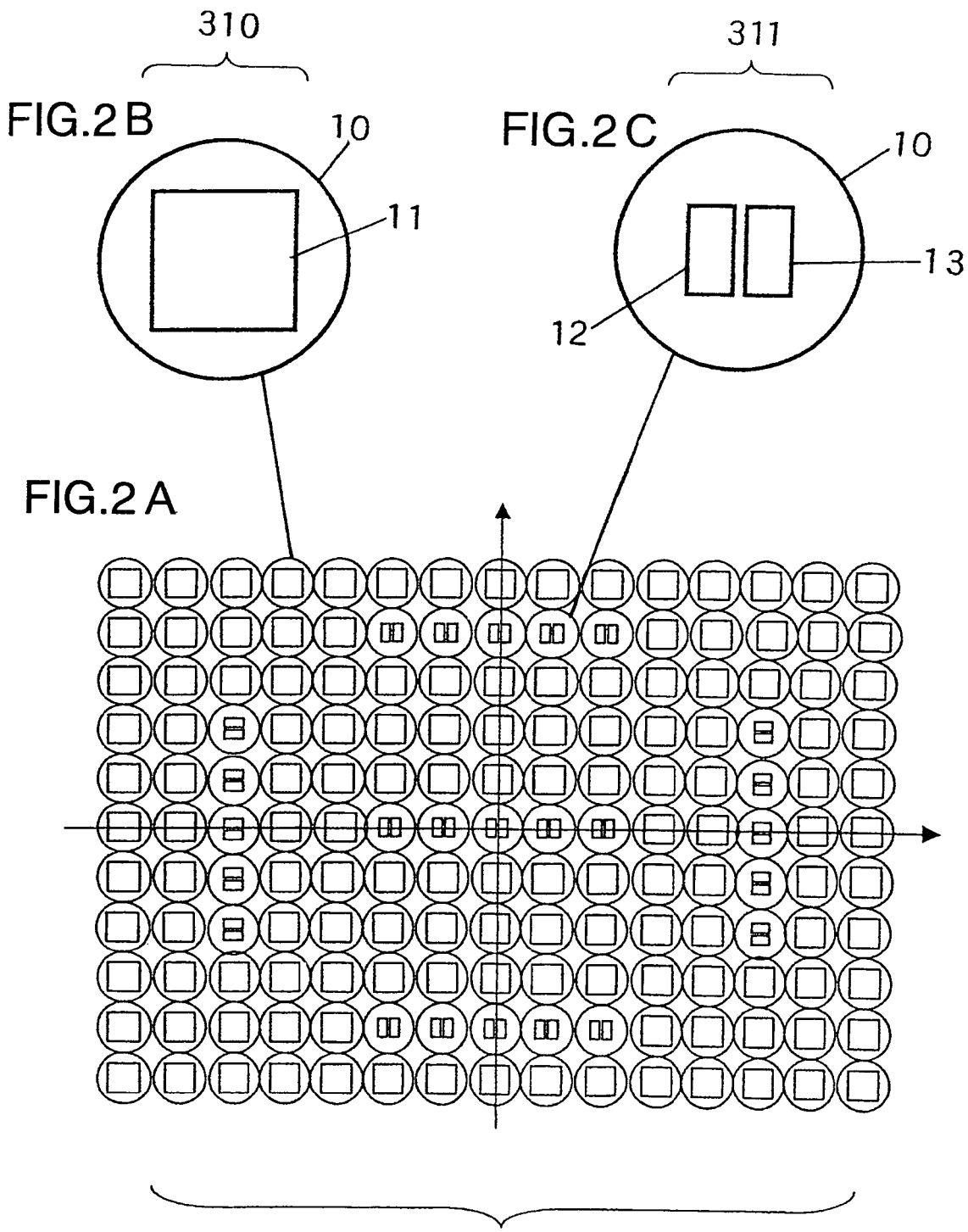
FIG. 2 is a front view showing in detail the structure of the image sensor.

FIG. 2 is a front view showing in detail the structure of the image sensor 212. The image sensor 212 comprises imaging pixels 310 and focus detection pixels 311. As shown in FIG. 2A, the imaging pixels 310 are arrayed two-dimensionally, whereas the focus detection pixels 311 are disposed over areas corresponding to the five focus detection positions indicated as P11 to P15 in FIG. 11B. The imaging pixels 310 each include a micro-lens 10 and a photoelectric conversion unit 11 used for imaging purposes, as shown in FIG. 2B. The focus detection pixels 311 each include a micro-lens 10 and a pair of photoelectric conversion units 12 and 13 used for focus detection purposes, as shown in FIG. 2C.

Figure 3:
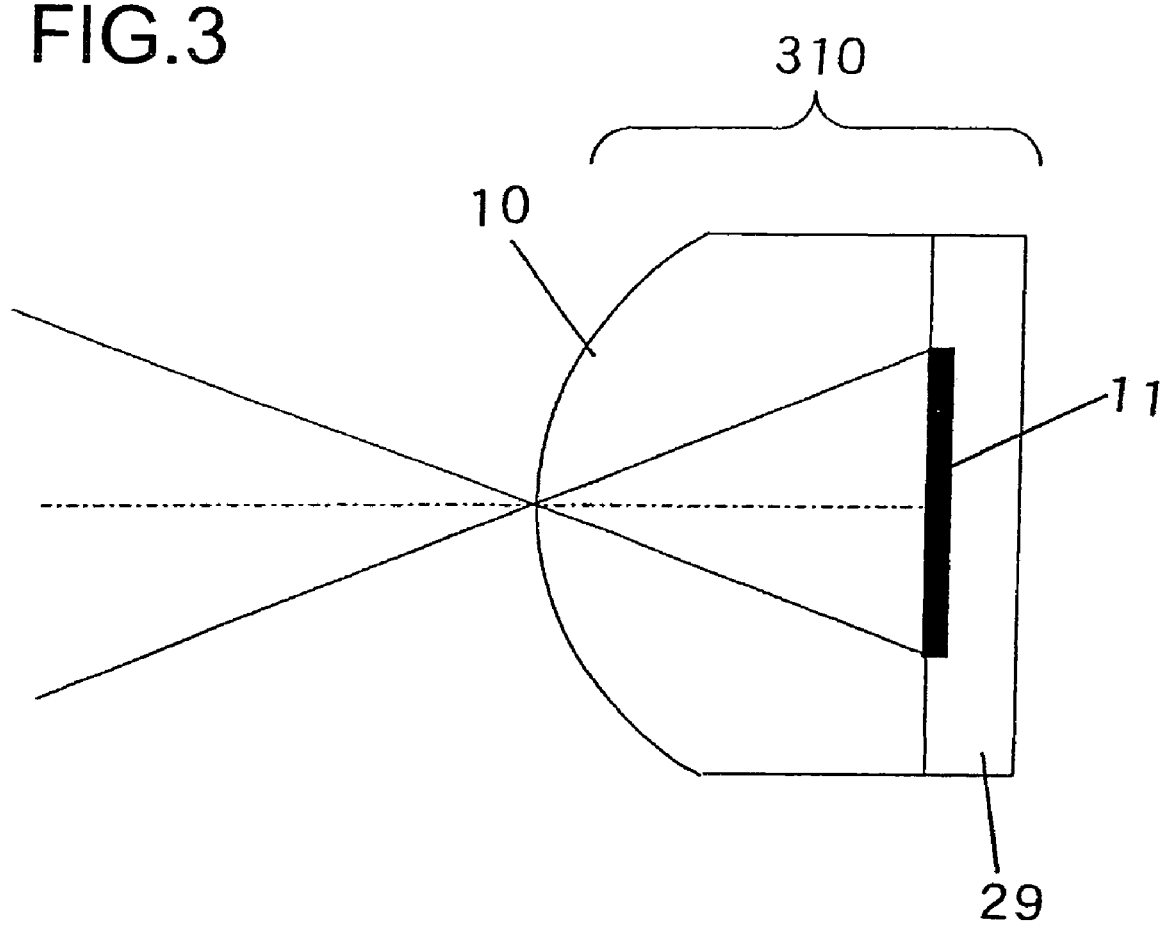
FIG. 3 is a sectional view of an imaging pixel.

FIG. 3 is a sectional view of an imaging pixel 310. The micro-lens 10 is set to the front of the imaging photoelectric conversion unit 11 at the imaging pixel 310 and, as a result, the image of the photoelectric conversion unit 11 is projected frontward via the micro-lens 10. The photoelectric conversion unit 11 is formed on a semiconductor circuit substrate 29.

Figure 4:
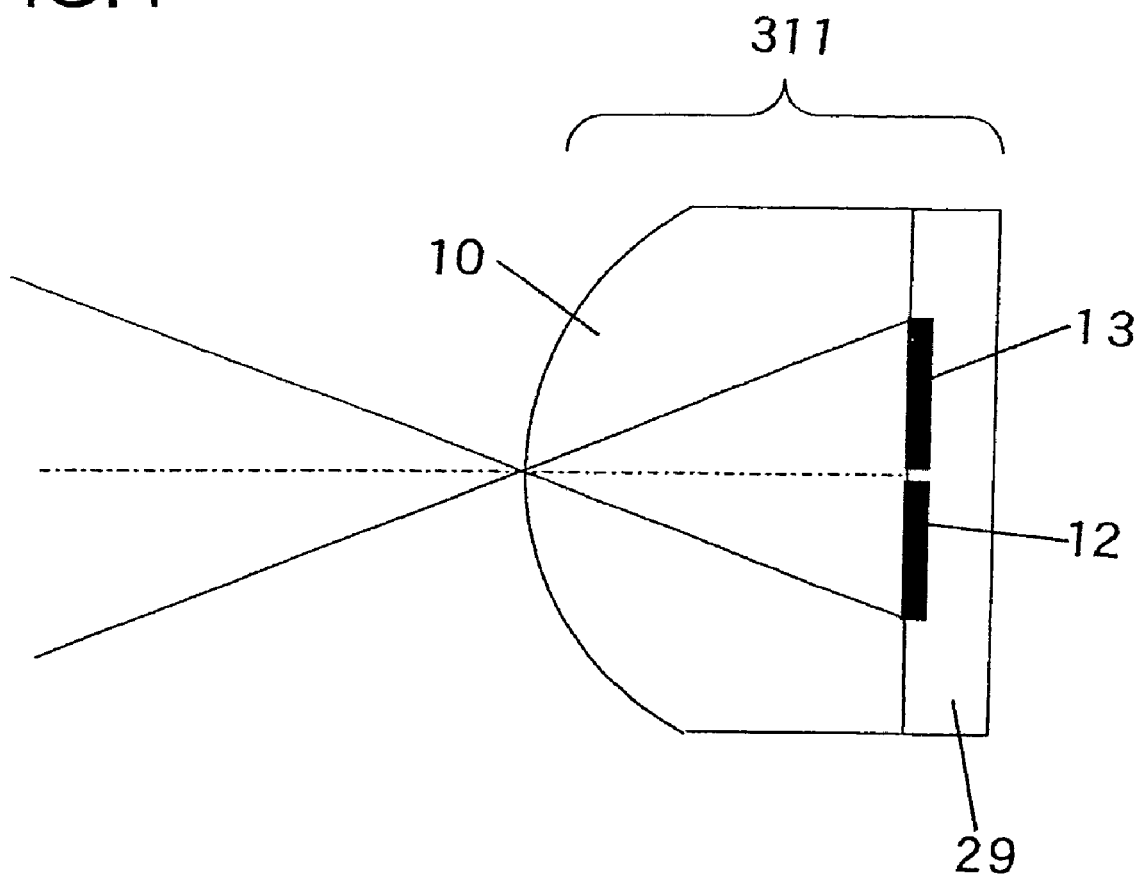
FIG. 4 is a sectional view of a focus detection pixel.

FIG. 4 is a sectional view of a focus detection pixel 311. In the focus detection pixel 311, the micro-lens 10 is disposed to the front of the photoelectric conversion units 12 and 13 used for focus detection and thus, the photoelectric conversion units 12 and 13 are projected frontward via the micro-lens 10. Images of the photoelectric conversion units 12 and 13 are formed on the same semiconductor circuit substrate 29. It is to be noted that the micro-lenses 10 disposed at the front of the imaging pixel 310 and the focus detection pixel 311 are positioned on the estimated focus plane of the exchangeable lens 202.

Figure 5:
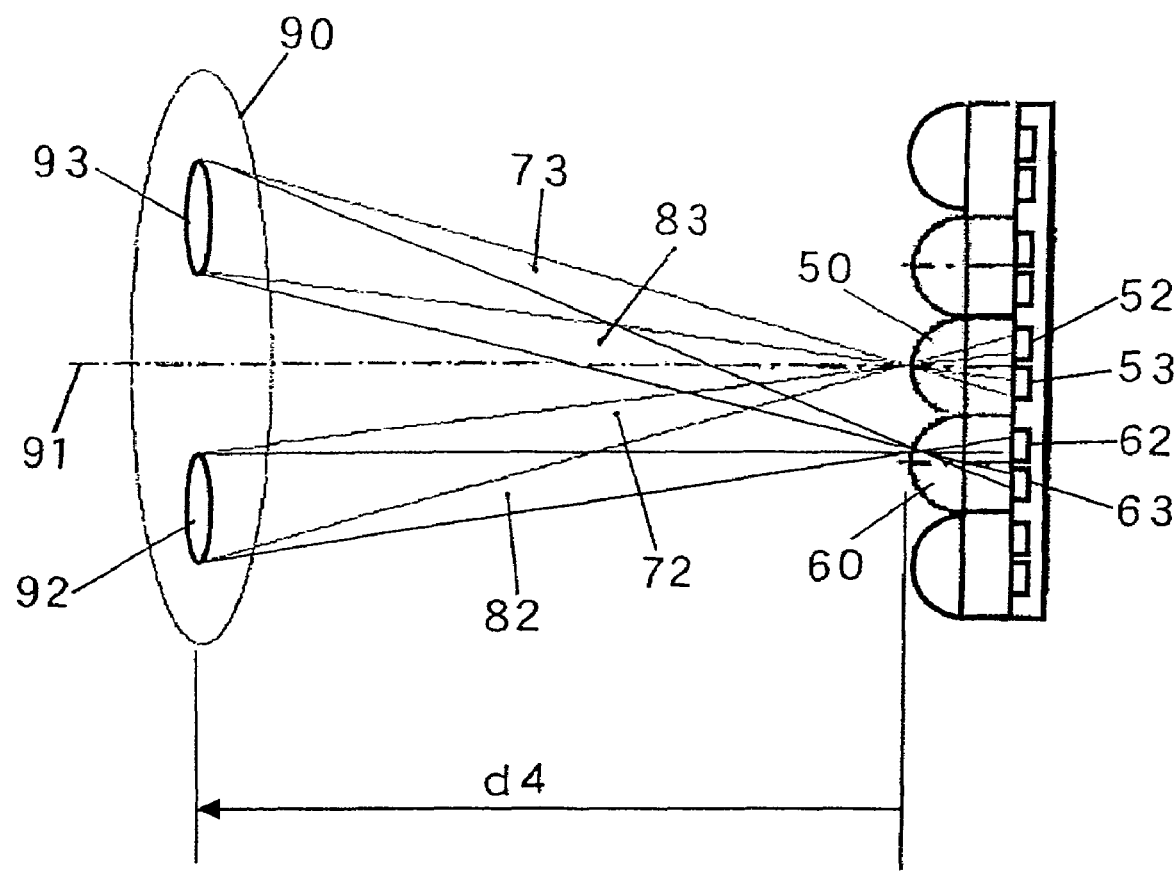
FIG. 5 illustrates a pupil division-type phase difference detection method achieved in conjunction with micro-lenses.

FIG. 5 illustrates a pupil division-type phase difference detection method achieved in conjunction with the micro-lenses. It is to be noted that FIG. 5 shows only some of the focus detection pixels 311 (micro-lenses 50 and 60 and two pairs of photoelectric conversion units 52/53 and 62/63). Reference numeral 90 indicates the exit pupil set over a distance d4 along the frontward direction from the micro-lenses 50 and 60 disposed on the estimated focus plane of the exchangeable lens 202. It is to be noted that the distance d4 is determined in correspondence to the curvature of the micro-lenses, the refractive index of the micro-lenses, the distance between the micro-lenses and the photoelectric conversion units and the like. The distance d4 between the estimated focus plane of the exchangeable lens 202 and the exit pupil is referred to as a range-finding pupil distance in this specification.

Reference numeral 91 indicates the optical axis of the exchangeable lens 202. Reference numeral 92 indicates a range (range-finding pupil) defined by the photoelectric conversion units 52 and 62 projected via the micro-lenses 50 and 60, whereas reference numeral 93 indicates the range (range-finding pupil) defined by the photoelectric conversion units 53 and 63 projected via the micro-lenses 50 and 60. The two pairs of focus detection light fluxes 72/73 and 82/83 from the subject having passed through the pair of range-finding pupil ranges 92 and 93 reach the two pairs of photoelectric conversion units 52/53 and 62/63 via the micro-lenses 50 and 60 respectively.

FIG. 5 schematically shows the focus detection pixel 311 (constituted with the micro-lens 50 and the pair of photoelectric conversion units 52 and 53) set on the optical axis 91 and the focus detection pixel 311 (constituted with the micro-lens 60 and the pair of photoelectric conversion units 62 and 63) set off the optical axis. In each of the other focus detection pixels 311, too, the focus detection light fluxes reaching the micro-lens from a pair of range-finding pupils are received at the pair of photoelectric conversion units. It is to be noted that the focus detection pixels 311 are arrayed along the direction matching the direction in which the pair of range-finding pupils are separated from each other.

The micro-lenses 50 and 60 are set near the estimated focus plane of the exchangeable lens 202. The shapes of the pair of photoelectric conversion units 52 and 53 disposed behind the micro-lens 50 set on the optical axis 91 are projected via the micro-lens 50 onto the exit pupil 90 set apart from the micro-lenses 50 and 60 by the projection distance d4 and the projected shapes define the range-finding pupils 92 and 93.

The shapes of the pair of photoelectric conversion units 62 and 63 disposed behind the micro-lens 60 set off the optical axis 91 are projected via the micro-lens 60 onto the exit pupil 90 set apart by the projection distance d4 and the projected shapes define the range-finding pupils 92 and 93. Namely, the projecting direction for each pixel is determined so that the projected shapes (range-finding pupils 92 and 93) of the photoelectric conversion units in the individual pixels are aligned on the exit pupil 90 set over the range-finding pupil distance d4.

The photoelectric conversion unit 52 outputs a signal corresponding to the intensity of an image formed on the micro-lens 50 with the focus detection light flux 72 having passed through the range-finding pupil 92 and having advanced toward the micro-lens 50. In addition, the photoelectric conversion unit 53 outputs a signal corresponding to the intensity of an image formed on the micro-lens 50 with the focus detection light flux 73 having passed through the range-finding pupil 93 and having advanced toward the micro-lens 50.

Also, the photoelectric conversion unit 62 outputs a signal corresponding to the intensity of an image formed on the micro-lens 60 with the focus detection light flux 82 having passed through the range-finding pupil 92 and having advanced toward the micro-lens 60. The photoelectric conversion unit 63 outputs a signal corresponding to the intensity of an image formed on the micro-lens 60 with the focus detection light flux 83 having passed through the range-finding pupil 93 and having advanced toward the micro-lens 60.

By arranging numerous focus detection pixels 311 each structured as described above and integrating the outputs from the pairs of photoelectric conversion units 12 and 13 disposed behind the focus detection pixels 311, into output groups each corresponding to one of the two range-finding pupils 92 and 93 respectively, information related to the intensity distribution of the pair of images formed on the pixel row with the individual focus detection light fluxes passing through the range-finding pupil 92 and the range-finding pupil 93 is obtained. Next, image shift detection arithmetic processing (correlational processing, phase difference detection processing) to be detailed later, is executed by using the information thus obtained so as to detect the shift amount between the pair of images through the pupil division-type phase difference detection method.

The image shift amount is then multiplied by a predetermined conversion coefficient and, as a result, the extent of deviation (defocus amount) of the current image forming plane relative to the estimated focus plane can be calculated. It is to be noted that the defocus amount assumes different values at various focus detection positions. The accuracy with which the defocus amount (image shift amount) is detected is determined in correspondence to the image shift amount detection pitch and when the focus detection is executed by using micro-lenses, the detection accuracy is determined in correspondence to the pitch at which the micro-lenses are set.

Figure 6:
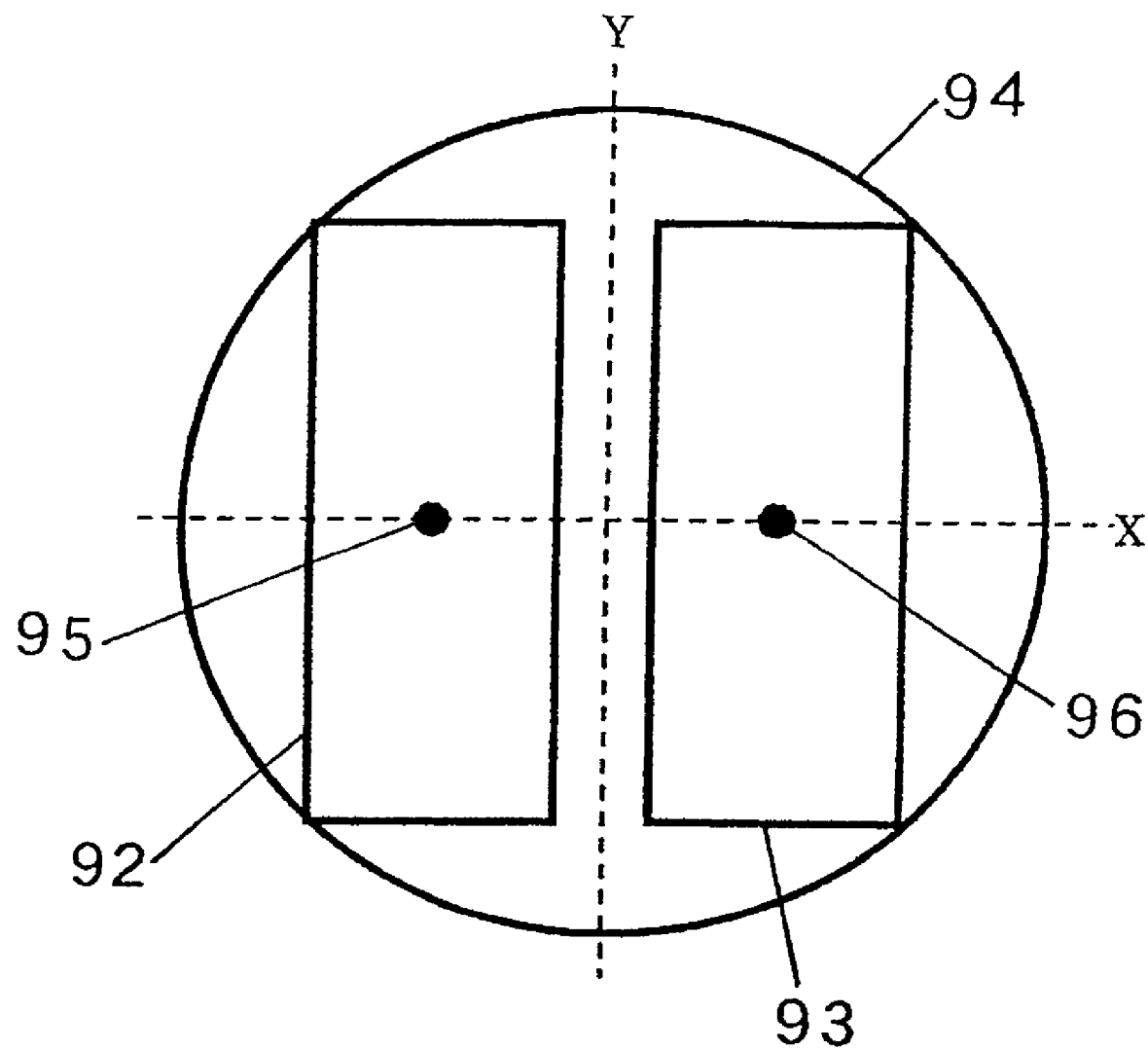
FIG. 6 is a front view, showing the relationship between the projection areas (range-finding pupils) of the pair of photoelectric conversion units in a focus detection pixel over the exit pupil plane.

FIG. 6 is a front view showing the relationship between the projection ranges (range-finding pupils) over which the pair of photoelectric conversion units 12 and 13 in a focus detection pixel 311 are projected on the exit pupil plane 90. A circumscribing circle 94 circumscribing the range-finding pupils 92 and 93 (indicated by the solid lines) formed by projecting the pair of photoelectric conversion units 12 and 13 in the focus adjustment pixel 311 onto the exit pupil plane 90 via the micro-lens 10, as viewed from the estimated focus plane, assumes a specific minimum f-number (maximum aperture). In the specification, the minimum f-number is referred to as a range-finding pupil f-number. Under normal circumstances, if the minimum f-number of the aperture opening in the exchangeable lens 202 corresponds to a brightness level higher than that corresponding to the range-finding pupil f-number, the focus detection light fluxes are not blocked at the aperture opening at the exchangeable lens 202 and, as a result, highly accurate focus detection is enabled.

If the distance to the exit pupil, which corresponds to the aperture opening at the exchangeable lens 202, does not match the range-finding pupil distance, the focus detection accuracy is lowered for the following reasons. Namely, when detecting the focus at a position in the periphery of the image plane, the focus detection light fluxes may be partially blocked at pixels present in the periphery of the image plane even if the minimum f-number of the aperture opening at the exchangeable lens 202 indicates a brightness higher than that corresponding to the range-finding pupil f-number. In FIG. 6, points 95 and 96 indicate the positions of the gravitational centers of the range-finding pupils 92 and 93 taken along the direction in which the range-finding pupils are set next to each other (along the x direction). The value selected for the conversion coefficient used to convert the image shift amount to the defocus amount is determined in correspondence to the opening angle formed by viewing the gravitational center positions 95 and 96 from the focus detection position on the estimated focus plane. The focus detection accuracy improves as the opening angle increases, whereas the defocus amount detection range increases as the opening angle becomes smaller.

Figure 11A:
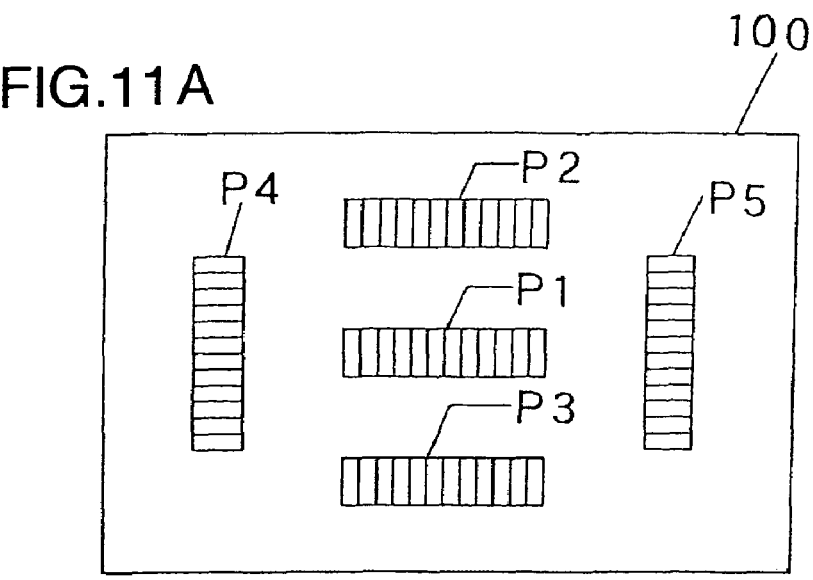
FIG. 11 shows the focus detection positions assumed on the photographic image plane.
Figure 11B:
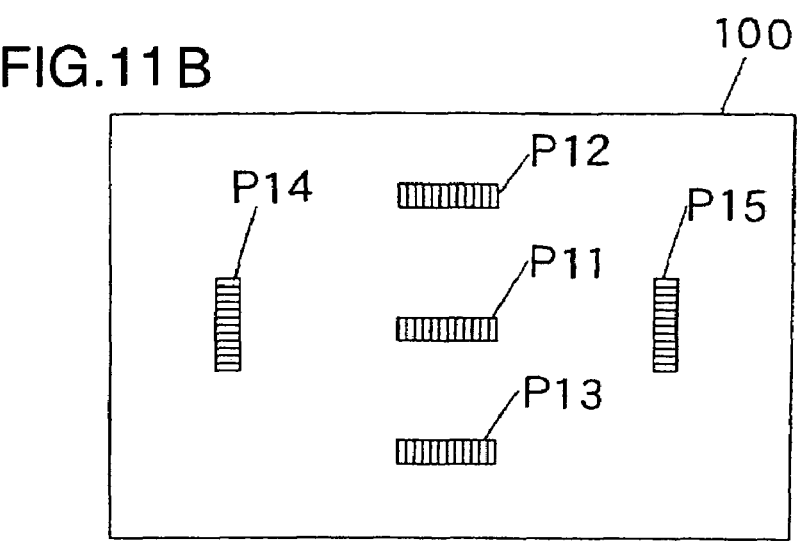

It is to be noted that FIG. 6 shows the range-finding pupils corresponding to the focus detection positions P11, P12 and P13 in FIG. 11B. The range-finding pupils corresponding to the focus detection positions P14 and P15 are formed at positions reached by rotating the range-finding pupils in FIG. 6 by 90° and the circle (range-finding pupil f-number) circumscribing these range-finding pupils is identical to that shown in FIG. 6.

Figure 7:
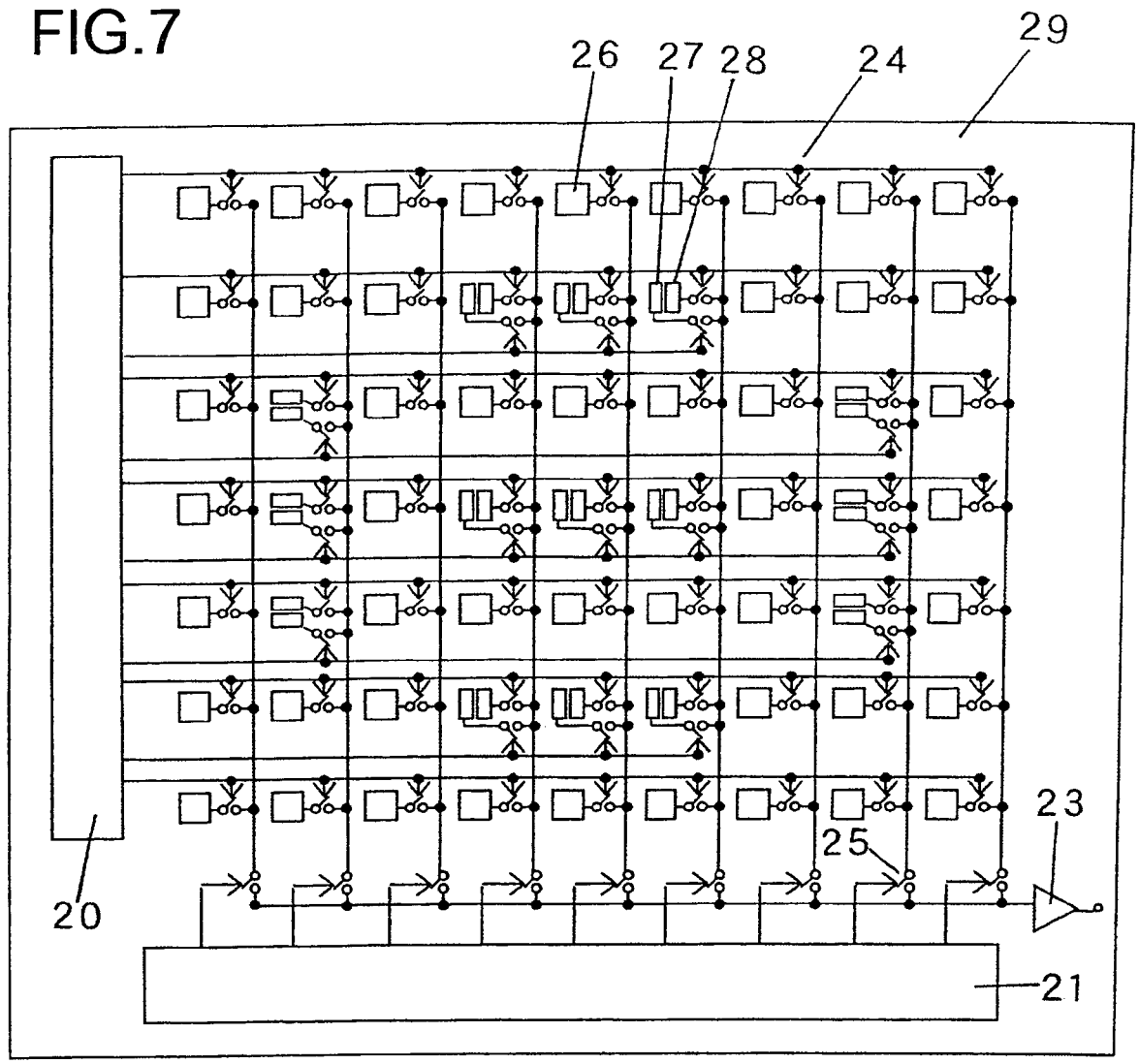
FIG. 7 shows the circuit structure of the image sensor.

FIG. 7 shows the circuit structure adopted in the image sensor 212. The image sensor 212 includes a read circuit through which the output signals from the photoelectric conversion units are read out. Reference numeral 26 indicates the photoelectric conversion unit (equivalent to 11 in FIGS. 2 and 3) a teach imaging pixel 310, whereas reference numerals 27 and 28 indicate a pair of photoelectric conversion units (equivalent to 12 and 13 in FIGS. 2 and 4) in each focus detection pixel 311. A vertical transfer register 20 turns on/off transfer MOS switches 24 each provided in correspondence to one of the photoelectric conversion units 26, 27 and 28 and transfers the outputs from the photoelectric conversion units 26 to 28 to transfer MOS switches 25 in units of the individual pixel lines.

A horizontal transfer register 21 sequentially turns on/off the transfer MOS switches 25 and thus sequentially transfers the outputs having been transferred via the transfer MOS switches 24 to an amplifier 23. The amplifier 23 amplifies the outputs transferred via the transfer MOS switches 25 and outputs the amplified outputs to the outside of the image sensor 212. The photoelectric conversion units, the transfer MOS switches, the registers and the amplifier are all formed on the semiconductor substrate 29.

The manufacturing costs can be reduced by using the image sensors 212 to constitute a MOS image sensor instead of a CCD image sensor. Since the focus detection pixels are also constituted with MOS image sensors, data from the specific focus detection pixels corresponding to the selected focus detection position alone can be read out at high speed.

Figure 8:
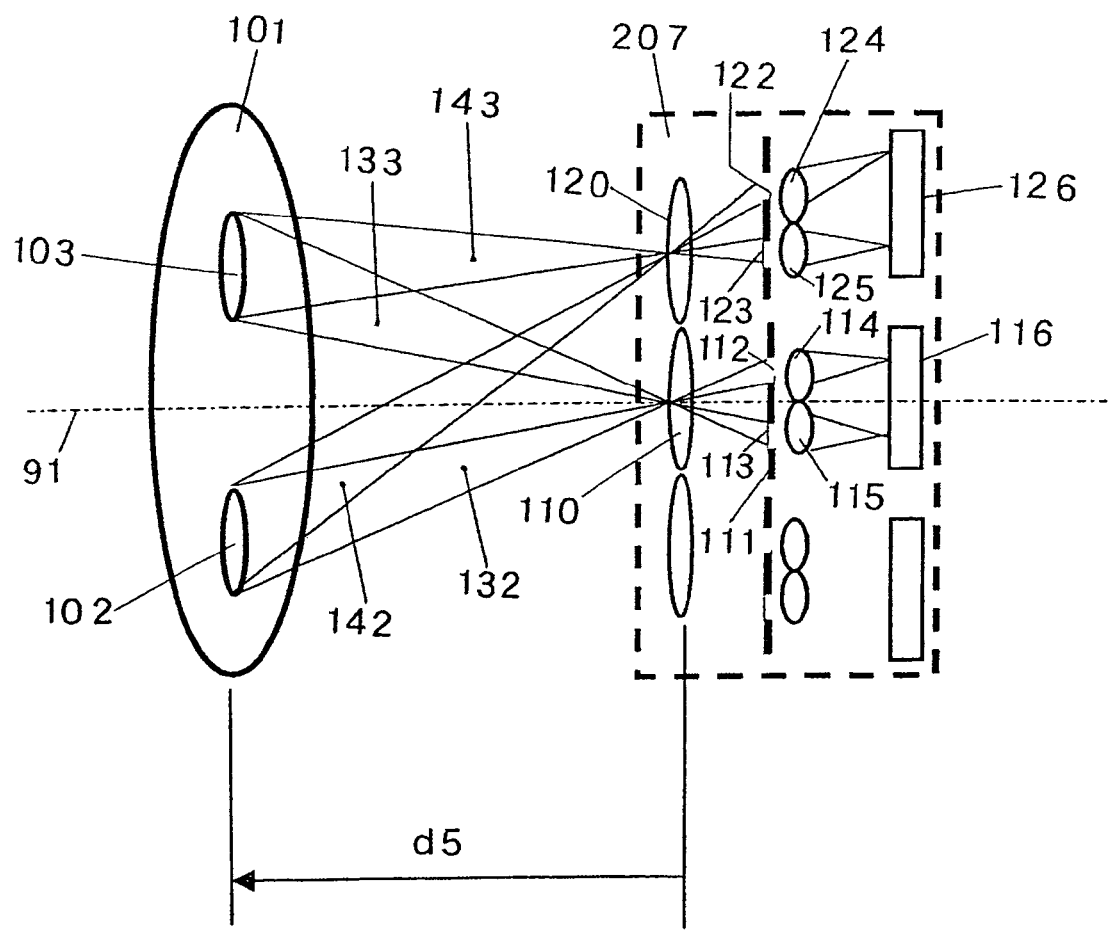
FIG. 8 shows in detail the structure adopted in a focus detection sensor corresponding to that shown in FIG. 1.

FIG. 8 shows in detail the structure adopted in the focus detection sensor 207 shown in FIG. 1. An explanation is now given on a focus detection method adopting an image reformation system in reference to FIG. 8. In FIG. 8, reference numeral 91 indicates the optical axis of the exchangeable lens 202, reference numerals 110 and 120 each indicate a condenser lens, reference numerals 111 and 121 each indicate an aperture mask, reference numerals 112, 113, 122 and 123 each indicate an aperture opening, reference numerals 114, 115, 124 and 125 each indicate an image reforming lens, reference numerals 116 and 126 each indicate an image sensor (CCD) engaged in focus detection, and reference numerals 132, 133, 142 and 143 each indicate a focus detection light flux.

Reference numeral 101 indicates an exit pupil set over a distance d5 along the forward direction from the estimated focus plane of the exchangeable lens 202. The distance d5, which is determined in correspondence to the focal lengths of the condenser lenses 110 and 120, the distances from the condenser lenses 110 and 120 to the aperture openings 112, 113, 122 and 123 and the like, is to be referred to as a range-finding pupil distance. Reference numeral 102 indicates the range (range-finding pupil) defined by the aperture openings 112 and 122 projected via the condenser lenses 110 and 120, whereas reference numeral 103 indicates the range (range-finding pupil) defined by the aperture openings 113 and 123 projected via the condenser lenses 110 and 120. The condenser lens 110, the aperture mask 111, the aperture openings 112 and 113, the image reforming lenses 114 and 115 and the image sensor 116 constitute a focus detection unit engaged in a pupil division-type phase difference detection by adopting the image reformation method through which the focus detection is executed at a given position.

FIG. 8 schematically illustrates the focus detection unit present on the optical axis 91 and a focus detection unit present off the optical axis 91. By using a plurality of focus detection units in combination, exclusive AF for executing focus detection at the five focus detection positions P1 to P5 through the pupil division-type phase difference detection adopting the image reformation method is realized as shown in FIG. 11A. The focus detection unit present on the optical axis 91 includes the condenser lens 110 disposed near the estimated focus plane of the exchangeable lens 202, the image sensor 116 disposed behind the condenser lens, the pair of image reforming lenses 114 and 115 and the aperture mask 111. A primary image formed near the estimated focus plane is reformed onto the image sensor 116 via the pair of image reforming lenses 114 and 115 disposed between the condenser lens 110 and the image sensor 116. The aperture mask 111 includes a pair of aperture openings 112 and 113 set near (to the front in the figure) the pair of image reforming lenses 114 and 115.

The image sensor 116 is a line sensor that includes a plurality of photoelectric conversion units densely set along a straight line. The photoelectric conversion units in the image sensor are set next to one another along the direction matching the direction in which the pair of range-finding pupils are separated from each other (along the direction in which the aperture openings are set next to each other). Information corresponding to the light intensity distribution of the pair of images reformed on the image sensor 116 is output from the image sensor 116. Image shift detection arithmetic processing (correlational processing, phase difference detection processing) to be detailed later is then executed by using the information thus output so as to detect the extent of image shift between the pair of images through the pupil division-type phase difference detection method. The image shift amount is multiplied by a predetermined conversion coefficient and, as a result, the extent of deviation (defocus amount) of the current image forming plane relative to the estimated focus plane can be calculated.

The image sensor 116 is projected onto the estimated focus plane via the image reforming lenses 114 and 115, and the accuracy with which the defocused amount (image shift amount) is detected is determined in correspondence to the image shift amount detection pitch (the pitch at which the photoelectric conversion units, projected onto the estimated focus plane, are disposed in the image reformation method). The aperture openings 112 and 113 in the aperture mask 111 are projected via the condenser lens 110 to range over the areas 102 and 103 on the exit pupil 101. These areas 102 and 103 are referred to as range-finding pupils. In other words, the pair of images reformed on the image sensor 116 are formed with light fluxes passing through the pair of range-finding pupils 102 and 103 on the exit pupil 101. The light fluxes 132 and 133 passing through the pair of range-finding pupils 102 and 103 on the exit pupil 101 are referred to as focus detection light fluxes.

Figure 9:
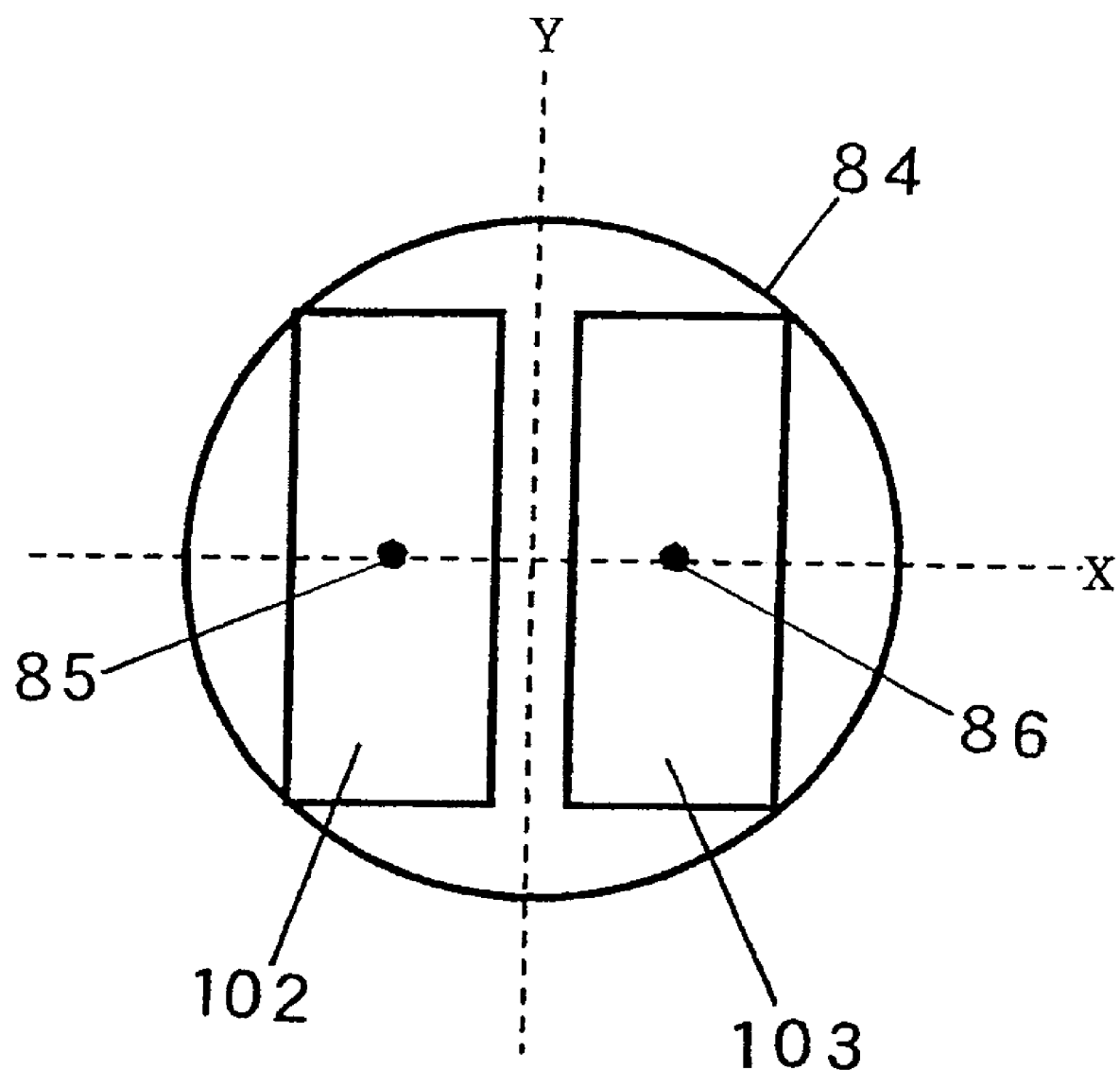
FIG. 9 shows the range-finding pupils on the exit pupil plane in an image reformation method.

FIG. 9 shows the range-finding pupils formed on the exit pupil plane by adopting the image reformation method. A circle 84 circumscribing the range-finding pupils 102 and 103 (indicated by the solid lines) which are formed by projecting the pair of aperture openings onto the exit pupil plane 101 via the condenser lens, when viewed from the estimated focus plane, assumes a specific minimum f-number (range-finding pupil f-number). The range-finding pupil f-number is set in the image reformation method to a level darker (a larger f-number) than the level corresponding to the range-finding pupil f-number selected in the micro-lens method shown in FIG. 6.

Points 85 and 86 indicate the positions of the gravitational centers of the range-finding pupils 102 and 103 taken along the direction (x direction) in which the range-finding pupils are formed side-by-side. The value of the conversion coefficient used to convert the image shift amount to the defocus amount is determined in correspondence to the opening angle formed by viewing the gravitational center positions 85 and 86 from the focus detection position on the estimated focus plane. A smaller opening angle is set in the image reformation method compared to the opening angle set in the micro-lens method shown in FIG. 6, so as to enable detection of a large defocus amount. It is to be noted that FIG. 9 shows the range-finding pupils corresponding to the focus detection positions P1, P2 and P3 in FIG. 11A. The range-finding pupils corresponding to the focus detection positions P4 and P5 are formed at positions reached by rotating the range-finding pupils in FIG. 9 by 90° and the circle (range-finding pupil f-number) circumscribing these range-finding pupils is identical to that shown in FIG. 9.

Figure 10:
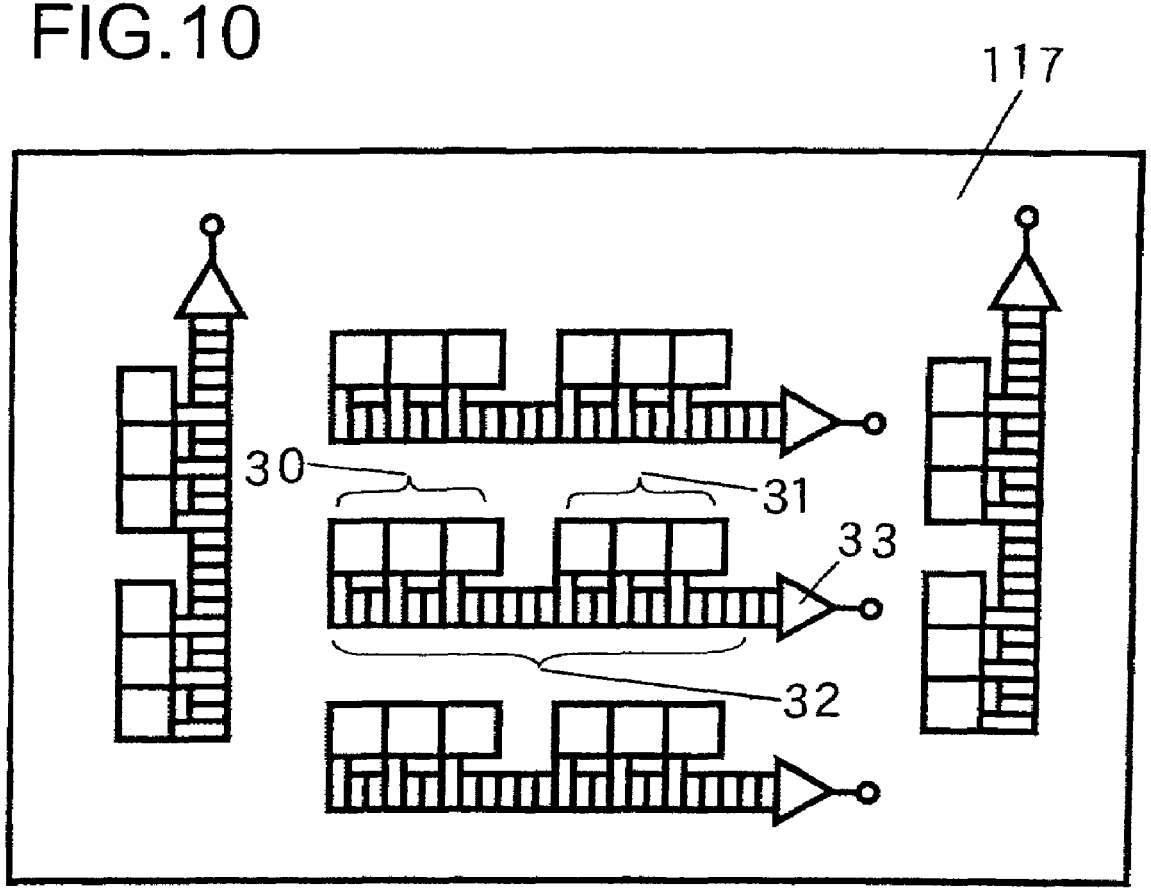
FIG. 10 shows the circuit structure of an image sensor constituting part of a focus detection sensor used for an exclusive AF operation.

FIG. 10 shows the circuit structure adopted in the image sensor (CCD) of the focus detection sensor 207 used in the exclusive AF operation. Reference numerals 30 and 31 indicate a pair of photoelectric conversion unit rows corresponding to one focus detection position, reference numeral 32 indicates a CCD transfer register that transfers the outputs from the pair of photoelectric conversion unit rows 30 and 31, and reference numeral 33 indicates an amplifier that amplifies the outputs transferred from the CCD transfer register 32 and outputs the amplified outputs to the outside. The CCD image sensor 117 includes five structural units each comprising the pair of photoelectric conversion unit rows, the CCD transfer register and the amplifier as described above in correspondence to the five focus detection positions shown in FIG. 11A.

The operational control in each structural unit, including the control on the length of the electrical charge storage time, the output transfer operation and the amplification operation, can be executed by itself completely independently. Since the operational control on the photoelectric conversion units corresponding to the plurality of focus detection positions can be executed independently of one another, it is possible to obtain outputs at the optimal level by independently controlling the lengths of the charge storage periods in correspondence to the brightness levels even when the levels of brightness vary greatly at the plurality of focus detection positions. This structure is ideal in applications in which focus detection is executed simultaneously at all the focus detection positions.

FIG. 11 shows the focus detection positions set within the imaging plane 100 on the estimated focus plane of the exchangeable lens 202. FIG. 11A shows areas (focus detection areas) where the image is sampled within the imaging plane 100 when the focus detection is executed with the focus detection sensor 207 through the pupil division-type phase difference detection by adopting the image reformation method. In the image reformation method, the photoelectric conversion unit rows at the image sensor are projected onto the image plane 100 and these projection areas are used as the focus detection areas. Accordingly, the sampling pitch as well as the length and width of the focus detection areas are determined in correspondence to the size of the photoelectric conversion units, the length of the photoelectric conversion unit rows, the pitch at which the individual photoelectric conversion units are disposed, and the projection magnification factor of the image reforming lenses.

FIG. 11B shows areas (focus detection areas) where the image is sampled within the imaging plane 100 when executing the focus detection in the macro-lens method. In the macro-lens method, the rows of micro-lenses are used as the focus detection areas on the image plane 100. Accordingly, the sampling pitch as well as the length and width of the focus detection areas is determined in correspondence to the size of the micro-lenses, the length of the micro-lens rows and the pitch at which the individual micro-lenses are disposed to form the micro-lens rows.

Figure 11C:
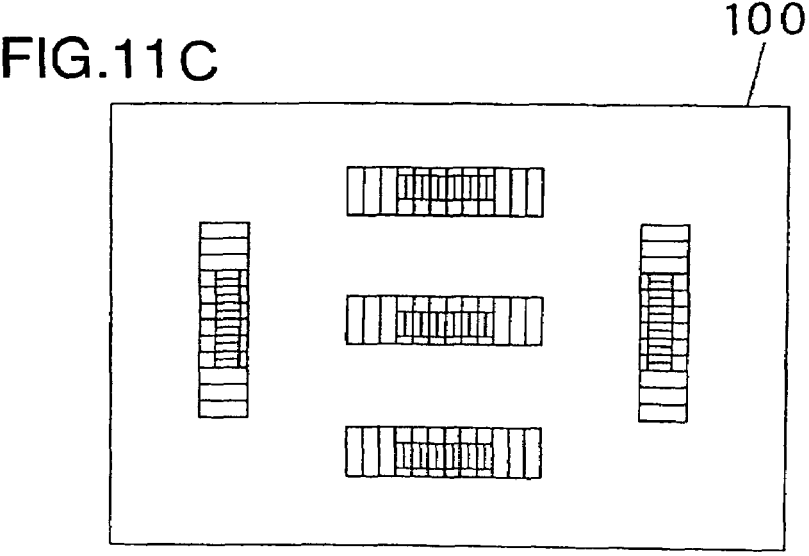

FIG. 11C shows the focus detection areas defined in the image reformation method (exclusive AF) and the micro-lens method (image sensor AF) superimposed upon each other. The focus detection areas defined in the two methods overlap each other at the five positions. By setting the length of the focus detection areas defined in the image reformation method to a value greater than that of the length of the focus detection areas defined in the micro-lens method, a greater shift can be taken for the image shift calculation so as to increase the defocus amount detection range. If the focus detection areas are set to assume a great length in the micro-lens method, a greater number of focus detection pixels is required, which is bound to lead to lower quality in the captured image.

In addition, by defining the focus detection areas in the image reformation method (exclusive AF) over a greater width compared to the width of the focus detection areas defined in the micro-lens method (image sensor AF), it is possible to ensure that the output level is not lowered even when the brightness is low and that the response does not become poor when the electrical charges are stored over a greater length of time. If the width of the focus detection areas defined in the micro-lens method is increased, it becomes necessary to increase the number of focus detection pixels or increase the size of the focus detection pixels, which is bound to lower the quality of the captured image.

By selecting a smaller detection pitch for the focus detection areas used in the image reformation method (exclusive AF) compared to the detection pitch selected for the focus detection areas defined in the micro-lens method (image sensor AF), the image shift amount detection accuracy (focus detection accuracy) can be improved. If, on the other hand, a larger detection pitch is selected for the focus detection areas corresponding to the image reformation method, it is possible to ensure that the output level is not lowered even when the brightness is low and that the response is not slowed down when the charges are stored over a greater length of time. At the same time, the number of outputs can be reduced, which, in turn, makes it possible to sustain the desired response level through a reduction in the length of time required for the image shift calculation. It is more advantageous in the micro-lens method (image sensor AF) to match the focus detection pixel pitch with the imaging pixel pitch and the focus detection pixels cannot easily be set to a larger pitch in the micro-lens method (image sensor AF).

The characteristics of the AF (exclusive AF) executed with the focus detection sensor 207 through the image reformation method and the characteristics of the AF (image sensor AF) executed through the micro-lens method are summarized in Table 1.

TABLE 1 comparison of characteristics of exclusive AF and image sensor AF

| characteristics description | Exclusive AF | image sensor AF |
|---|---|---|
| AF unit size | relatively large | relatively small |
| brightness detection range | low to high | intermediate to high |
| defocus amount detection range | Wide | narrow |
| focus detection accuracy | inferior to image sensor AF | high |
| multi-AF area control | Suited | not suited |
| high-density AF area setting | not suited | suited |
| detection pitch | larger than image sensor AF | fine |
| pinpoint detection | not suited | suited |
| interlocking with imaging operation | not suited | suited |
| moving subject | Suited | not suited |

The AF unit for the exclusive AF, which requires the space for the image reformation, needs to have larger dimensions than the image sensor AF unit and, in particular, it needs to have a significant thickness taken along the optical axis. The image sensor AF unit, on the other hand, with the photoelectric conversion units disposed directly behind the micro-lenses, is allowed to assume smaller dimensions compared to the exclusive AF unit and, in particular, it is allowed to assume smaller dimensions along the optical axis. The exclusive AF unit, in which the photoelectric conversion units are allowed to assume a considerable size, is enabled to execute focus detection over a wide brightness range, from low to high brightness levels. The image sensor AF unit, on the other hand, is embedded in the image sensor and, since this structure does not allow its photoelectric conversion units to assume a significant size, the focus detection cannot be executed with ease at low brightness levels with the image sensor AF.

Through the exclusive AF in conjunction with which the focus detection areas assume a significant length and the gravitational centers of the range-finding pupils form a small opening angle, a large defocus amount can be detected within its defocus amount detection range. In other words, the defocus amount detection range of the exclusive AF is large. In the case of the image sensor AF in conjunction with which the focus detection areas assume a small length and the gravitational centers of the range-finding pupils form a large opening angle, on the other hand, the defocus amount detection range is limited. Through the exclusive AF in conjunction with which a large detection pitch is set on the estimated focus plane and the gravitational centers of the range-finding pupils form a small opening angle, the focus detection cannot be executed as accurately as that achieved through the image sensor AF. In other words, through the image sensor AF in conjunction with a fine detection pitch is set on the estimated focus plane and the gravitational centers of the range-finding pupils form a large opening angle, the focus detection can be executed with a high level of accuracy.

In order to enable multi-AF area control (independent control on the length of electrical charge storage period for the group of photoelectric conversion units corresponding to each of the plurality of focus detection positions and independent output read), the exclusive AF unit includes groups of photoelectric conversion units each corresponding to one of the focus detection positions and CCD registers each used to read out the output from a specific photoelectric conversion unit group. As a result, the length of electrical charge storage period can be controlled independently in correspondence to each of the focus detection positions and the output from the photoelectric conversion unit group corresponding to each focus detection position can be read out independently. In the image sensor AF unit, which includes photoelectric conversion unit groups, each corresponding to one of the various focus detection positions and a read circuit, both provided as part of the image sensor, independent electrical charge storage period control and independent output read cannot be executed as easily.

Since the exclusive AF unit needs to include an image reforming optical system in correspondence to each of the focus detection positions, a greater number of focus detection positions cannot be set in close proximity to one another with ease and thus, AF areas cannot be set with a high level of density. In the case of image sensor AF, AF areas can be set with ease each in correspondence to one of the focus detection positions set in close proximity to one another, simply by disposing focus detection pixels on the image sensor surface.

Since the photoelectric conversion units in the exclusive AF unit assume a significant size so as to enable focus detection at low brightness levels, the detection pitch cannot be set as fine as that in the image sensor AF unit. In the image sensor AF unit, which allows the focus detection pixels to assume a size equal to that of the imaging pixels, the detection pitch can be set finely.

The exclusive AF and the image sensor AF are compared with regard to pinpoint detection. The term "pinpoint detection" refers to focus detection executed over a very small image portion (e.g., the eye area of a person). The size of the photoelectric conversion units used in the exclusive AF is large, and a considerably large area is needed in conjunction with the sufficient number of photoelectric conversion units required for image shift detection. For this reason, the exclusive AF is not suited for the pinpoint detection. The image sensor AF, on the other hand, executed by using the small focus detection pixels, only requires a small area in conjunction with the sufficient number of photoelectric conversion units needed for image shift detection, and thus, it is suited for the pinpoint detection.

Since the exclusive AF unit is not part of the image sensor, an offset adjustment (mechanical or in software) for the relative positional difference needs to be executed when calculating the defocus amount manifesting on the image sensor in order to allow the exclusive AF to effectively interlock with the imaging operation. The image sensor AF executed by using the focus detection pixels included in the image sensor, on the other hand, does not require any offset adjustment.

Through the exclusive AF, which allows focus detection to be executed simultaneously over a plurality of AF areas independently of one another, the focus can be detected with a high level of reliability even when the subject moves within the imaging plane 100 over time. The image sensor AF, which does not facilitate simultaneous focus detection in a plurality of AF areas as readily as the exclusive AF, is not suited for focus detection of a moving subject.

Figure 12:
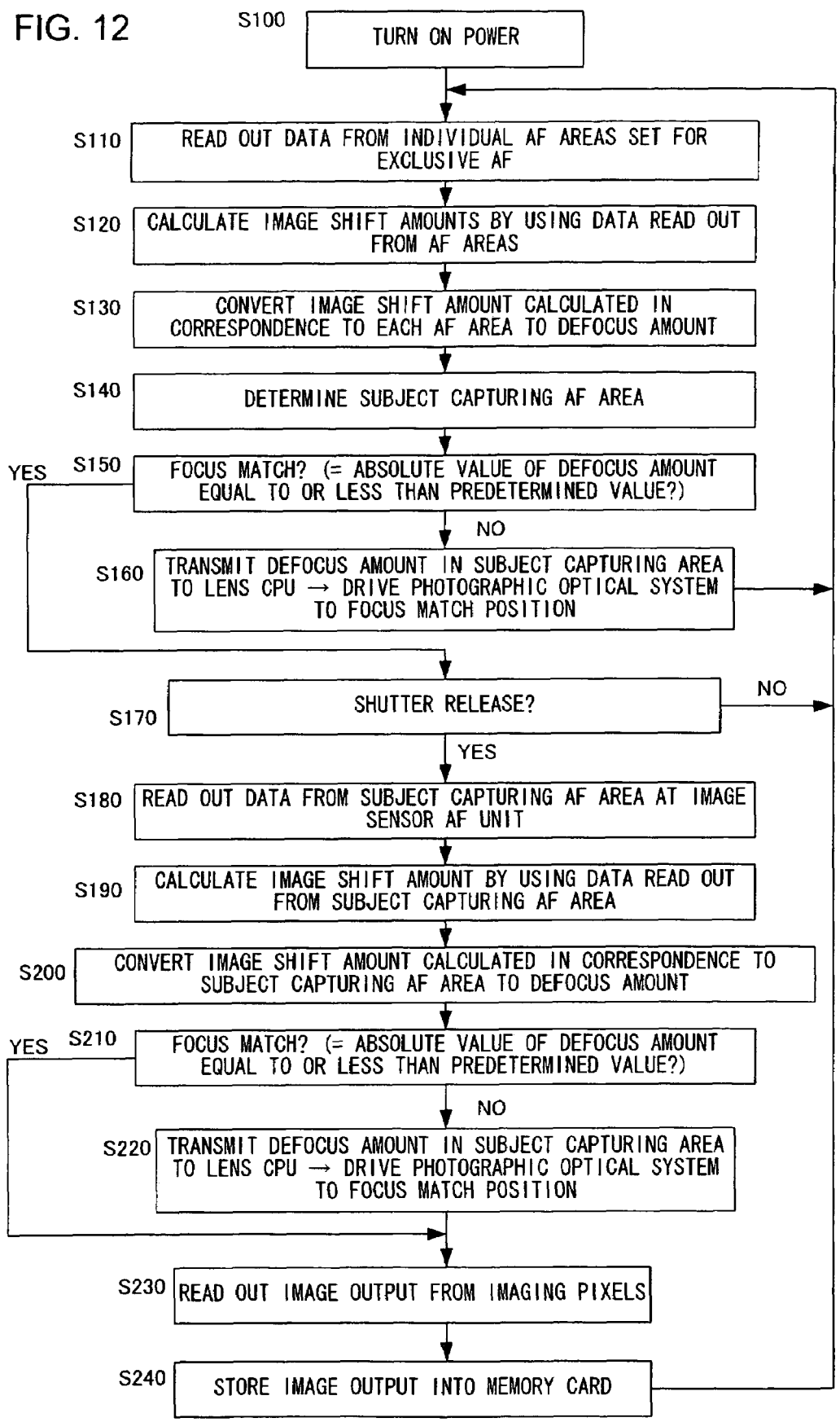
FIG. 12 presents a flowchart of the operations executed in the digital still camera (imaging device) in FIG. 1.

FIG. 12 presents a flowchart of the operations executed in the digital still camera (imaging device) shown in FIG. 1. After the power to the camera is turned on, the body CPU 214 repeatedly executes the processing starting in step S100. As the power to the camera is turned on and imaging operation is started in step S100, the operation proceeds to step S110. In step S110, a focus detection operation is executed in all the AF areas used for the exclusive AF and the data resulting from the focus detection operation are read out. In step S120 following step S110, image shift detection calculation processing is executed based upon the pair of sets of image data corresponding to each of the AF areas to calculate the image shift amount in each AF area. The procedure through which the image shift amount is calculated is now explained in reference to the flowchart presented in FIG. 13.

Figure 13:
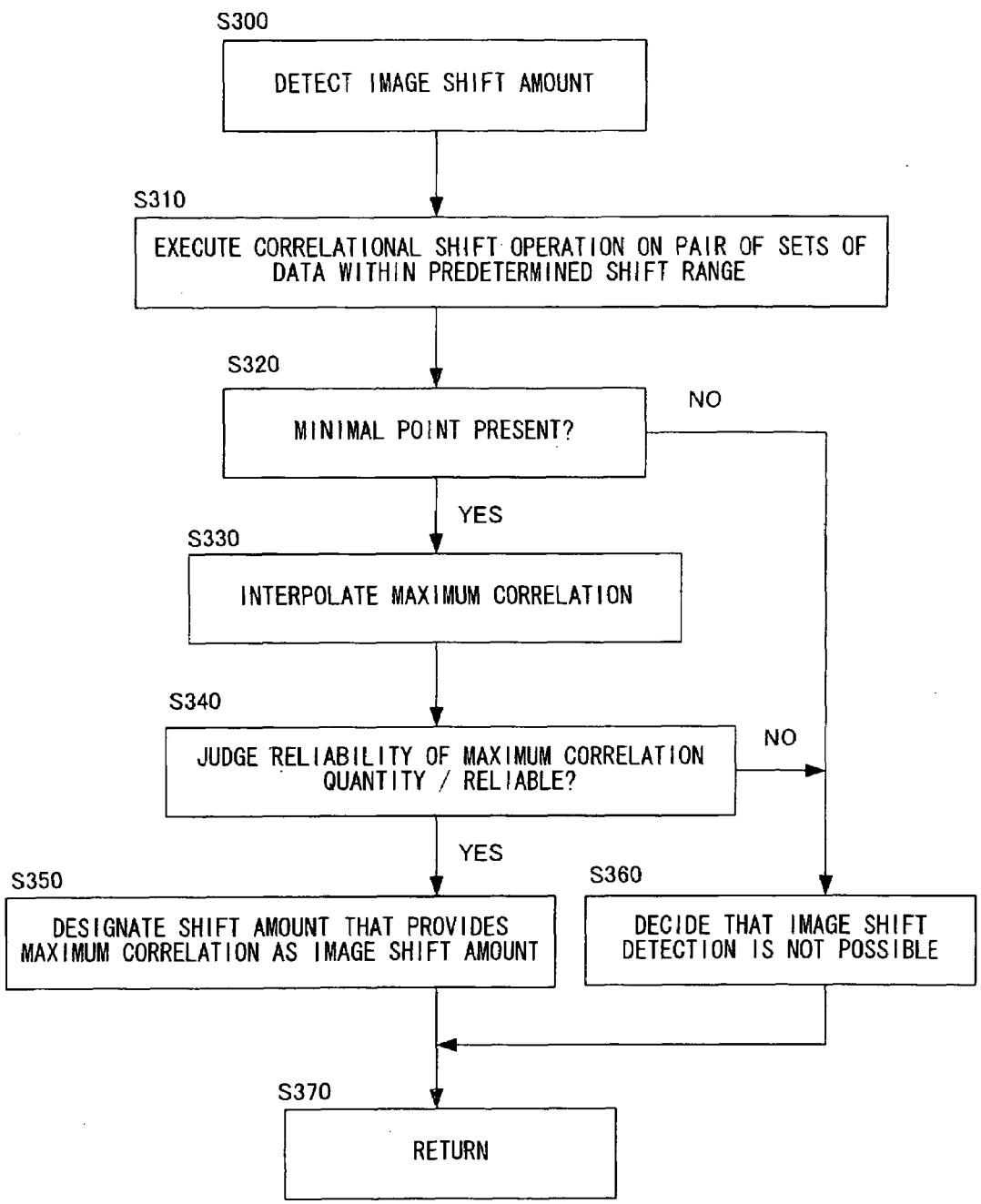
FIG. 13 presents a flowchart of the image shift amount detection operation.

In step S300 in the flowchart presented in FIG. 13, the image shift amount detection operation is started before the operation proceeds to step S310. In step S310, correlational shift operation calculation is executed on the pair of sets of data over a predetermined shift range. In step S320 following step S310, a decision is made as to whether or not there is a minimal point in conjunction with which three-point interpolation calculation can be executed. If it is decided that there is no such minimal point, the operation proceeds to step S360 in which it is judged that image shift detection is not possible (disabled focus detection), before the operation proceeds to step S370.

If, on the other hand, it is decided in step S320 that there is an eligible minimal point, the operation proceeds to step S330 to interpolate the maximum correlational quantity at a point close to the correlation quantity indicating the highest extent of correlation. In step S340 following step S330, the reliability of the maximum correlation quantity is judged. If it is decided that the maximum correlation quantity is not reliable, image shift detection is judged to be not possible (disabled focus detection) in step S360 before the operation proceeds to step S370. If, on the other hand, it is decided in step S340 that the maximum correlation quantity is reliable, the operation proceeds to step S350 to designate the shift amount corresponding to the calculated maximum correlation quantity as the image shift amount and then the operation proceeds to step S370. In step S370, the operation proceeds to step S130 in the flowchart presented in FIG. 12.

In step S130 in FIG. 12, the image shift amounts corresponding to the individual AF areas are converted to defocus quantities. The processing executed to convert each image shift amount to a defocus amount is now explained in reference to the flowchart presented in FIG. 14. In step S400, a defocus amount conversion operation is started and then the operation proceeds to step S410. In step S410, a decision is made as to whether or not the image shift amount detection is disabled. If it is decided that the image shift amount detection is disabled, the operation returns from step S450 to the flowchart presented in FIG. 13.

If it is decided that the image shift amount detection is enabled in step S410, the operation proceeds to step S420. In step S420, the image shift amount is multiplied by a predetermined conversion coefficient (which assumes different values in conjunction with the image reformation method and the micro-lens method), thereby obtaining through calculation the defocus amount. In step S430 following step S420, a decision is made as to whether or not the image shift amount has been calculated through the exclusive AF. If it is decided that the image shift amount has not been calculated through the image sensor AF, the operation returns from step S450 to the flowchart presented in FIG. 13. If, on the other hand, it is decided that the image shift amount has been calculated through the exclusive AF, the operation proceeds to step S440. In step S440, the offset amount is added to the defocus amount having been calculated, before the operation returns from step S450 to the flowchart presented in FIG. 13.

The offset amount added to the defocus quantities in this processing represents the difference between the exclusive AF and the image sensor AF, and a value obtained in advance through measurement and stored in memory can be used as the offset amount. Alternatively, a defocus amount obtained through focus detection executed through the image sensor AF after achieving focus match through the exclusive AF may be used as the offset amount.

Let us now resume the explanation in reference to the flowchart presented in FIG. 12. In step S140, a decision is made based upon the defocus quantities calculated in correspondence to the individual AF areas as to the specific AF area where the subject is captured. For instance, the object present in the closest range within the imaging plane 100 is normally most likely to be the photographic subject and accordingly, the AF area in correspondence to which the defocus amount indicating the closest range has been calculated may be recognized as the subject capturing area.

The image shift detection calculation processing (correlational algorithm) is now explained by using a specific AF area as an example. The correlation quantity C(L) is first calculated by using the differential correlational algorithm expressed in (1) below, with ei and fi (i=1 to m) representing the pair of sets of data corresponding to the AF area.

$$C(L)=\Sigma|e(i+L)-f(i)| \quad (1)$$

L in expression (1) is an integer representing the relative shift amount indicated in units corresponding to the pitch of the pair of sets of data. In addition, L assumes a value within a range Lmin to Lmax (−5 to +5 in the figure). The parameter i assumes a value within a range p to q, with p and q satisfying a conditional expression $1 \leq p \leq q \leq m$. The specific values assumed for p and q define the size of the focus detection area.

Figure 16:
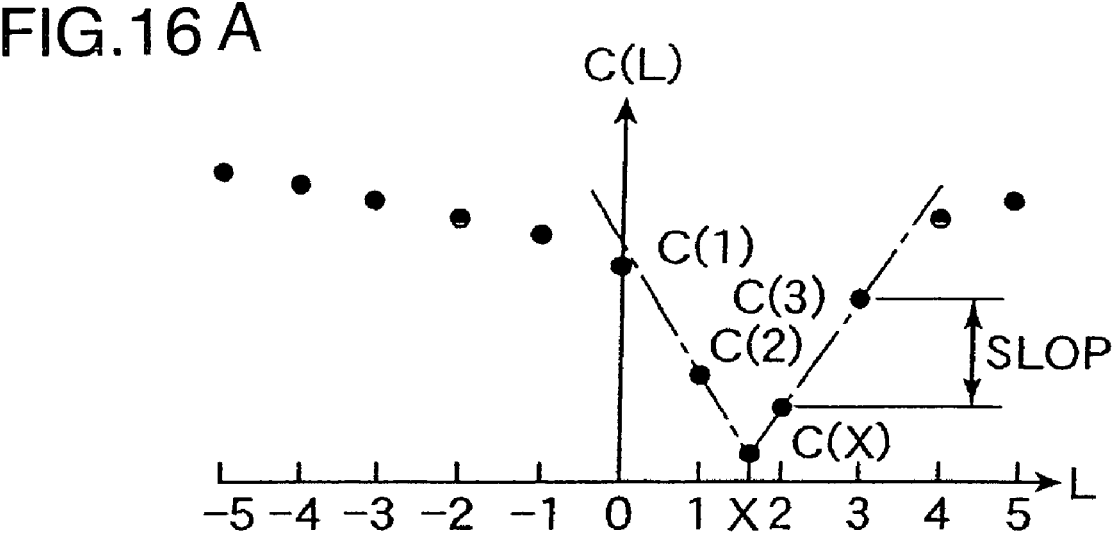
FIG. 16 illustrates the focus detection calculation algorithm.
Figure 16:
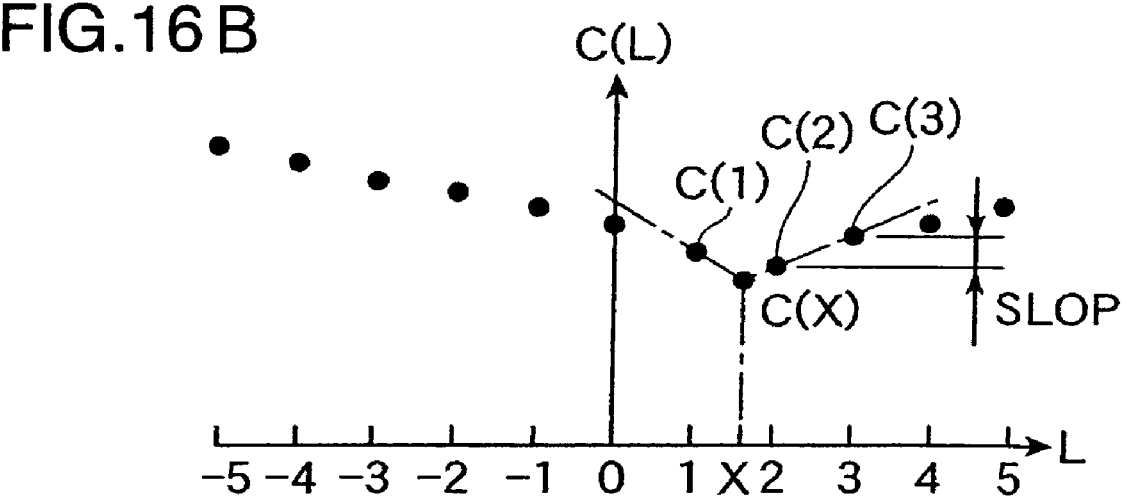
Figure 16:
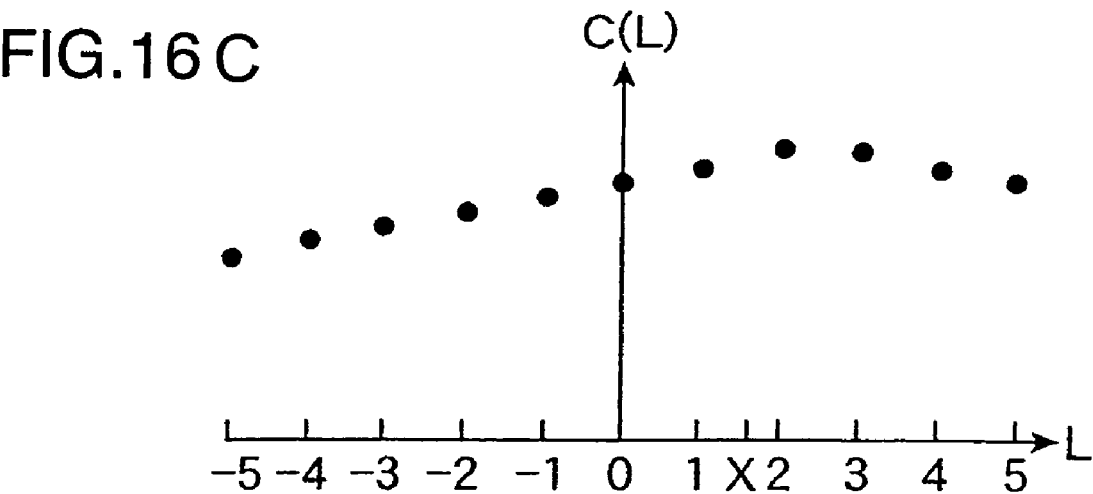

As shown in FIG. 16A, the results of the calculation executed as expressed in (1) indicate the smallest correlation quantity C(L) in correspondence to the shift amount L=kj (kj=2 in FIG. 16A) indicating the highest level of correlation between a pair of sets of data. Next, a shift amount x, which will provide the minimum value C(L)min=C(x) in a continuous curve representing the correlation quantities is determined through the three-point interpolation method as expressed in (2) to (5) below.

$$x=kj+D/SLOP \quad (2)$$

$$C(x)=C(kj)-|D| \quad (3)$$

$$D=\{C(kj-1)-C(kj+1)\}/2 \quad (4)$$

$$SLOP=MAX\{C(kj+1)-C(kj), C(kj-1)-C(kj)\} \quad (5)$$

In addition, a defocus amount DEF representing the extent of defocusing of the subject image plane relative to the estimated focus plane can be determined as expressed in (6) below based upon the shift amount x having been calculated.

$$DEF=KX \cdot PY \cdot x \quad (6)$$

PY in expression (6) represents the detection pitch, whereas KX in expression (6) represents the conversion coefficient that is determined in correspondence to the opening angle formed at the gravitational centers of the pair of range-finding pupils.

The judgment as to whether or not the calculated defocus amount DEF is reliable is made as follows. As shown in FIG. 16B, the interpolated minimum value C(X) of the correlation quantity increases when the level of correlation between the pair of sets of data is low. Accordingly, if C(X) is equal to or greater than a predetermined value, the defocus amount is judged to be less reliable. Alternatively, C(X) may be standardized with regard to the data contrast, and in such a case, if the value obtained by dividing C(X) by SLOP indicating a value in proportion to the contrast is equal to or greater than a predetermined value, the defocus amount should be judged to be not reliable. As a further alternative, if SLOP indicating the value in proportion to the contrast is equal to or less than a predetermined value, the subject should be judged to be a low contrast subject and, accordingly, the reliability of the calculated defocus amount DEF should be judged to be low.

It is to be noted that if the level of correlation between the pair of sets of data is low and the correlation quantity C(L) does not dip at all over the shift range Lmin to Lmax, as shown in FIG. 16C, the minimum value C(X) cannot be determined. Under such circumstances, it is judged that the focus detection is disabled.

Figure 15:
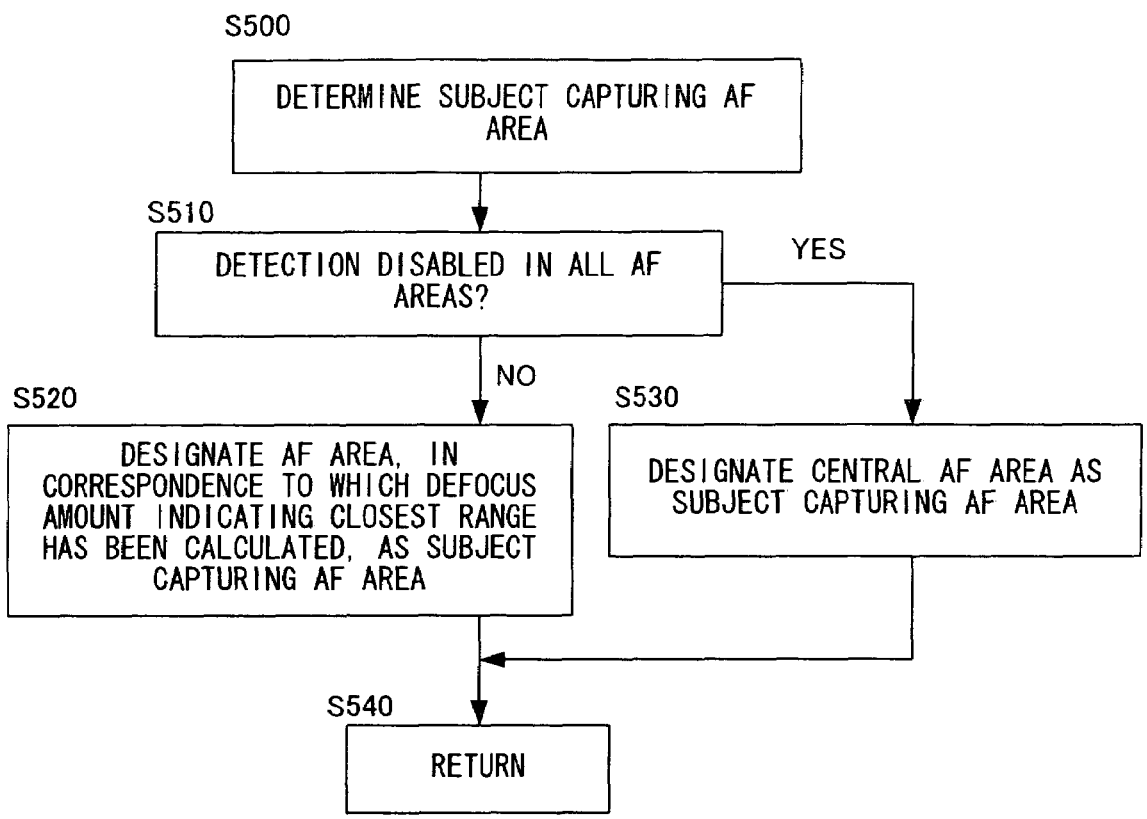
FIG. 15 presents a flowchart of the verification operation executed to verify the photographic subject capturing AF area.

FIG. 15 presents a flowchart of the operation executed in step S140 in FIG. 12 to determine the subject capturing AF area. In step S500, the subject capturing AF area verification operation is started and then the operation proceeds to step S510. In step S510, a decision is made as to whether or not the focus detection is disabled in all the AF areas. If the focus detection is determined to be disabled in all the AF areas, a decision is made as to whether or not the image shift amount detection is disabled, and if the image shift amount detection is judged to be disabled, the proceeds to step S530. In step S530, the central AF area (the AF area set at the center of the imaging plane 100) is designated as a temporary subject capturing AF area for convenience, and then the operation returns to the flowchart presented in FIG. 12 from step S540.

If, on the other hand, it is decided that the focus detection is enabled in step S510, the operation proceeds to step S520. If it is decided that there is at least one AF area, the AF area, in correspondence to which the defocus amount indicating the closest range has been calculated, is recognized as the subject capturing AF area in step S520, before the operation returns from step S540 to the flowchart presented in FIG. 12.

In step S150 in the flowchart presented in FIG. 12, a decision is made as to whether or not the absolute value of the defocus amount having been calculated in correspondence to the subject capturing AF area is equal to or less than a predetermined value. The predetermined value is selected in advance to be used to judge whether or not the subject is almost in focus through the exclusive AF. If the absolute value of the defocus amount calculated in correspondence to the subject capturing AF area is equal to or less than the predetermined value, it is judged to be already almost in focus. It is to be noted that if the focus detection is disabled (disabled image shift detection) in all the AF areas, the operation proceeds to step S170. In addition, if it is judged that the current status does not indicate a near focus match condition, the operation proceeds to step S160. In step S160, the defocus amount is transmitted to the lens drive control circuit 206 so as to enable the lens drive control circuit to drive the focusing lens 210 in the exchangeable lens 202 to the focus match position. Once the processing in step S160 ends, the operation returns to step S110 to repeatedly execute the operations described above.

If, on the other hand, it is decided that the current status indicates a near focus match condition, the operation proceeds to step S170. In step S170, a decision is made as to whether or not a shutter release has been executed. If it is decided that a shutter release has not been executed, the operation returns to step S110 to repeatedly execute the operations described above. If it is decided that a shutter release has been executed, the operation proceeds to step S180 to read out data from the focus detection pixels in the image sensor AF unit corresponding to the verified subject capturing AF area. In step S190 following step S180, the image shift detection calculation processing is executed based upon the pair of sets of image data corresponding to the subject capturing AF area to determine the image shift amount.

In step S200 following step S190, the image shift amount having been calculated in correspondence to the subject capturing AF area is converted to the defocus amount. In step S210, following step S200, a decision is made as to whether or not the absolute value of the defocus amount calculated for the subject capturing AF area is equal to or less than a predetermined value. The predetermined value is selected to be used when making a decision as to whether or not a focus match has been achieved through the image sensor AF (a value smaller than the predetermined value, which is used when making a decision as to whether or not a predetermined level of near focus match has been achieved in the exclusive AF, should be selected). If the absolute value of the defocus amount calculated for the subject capturing AF area is equal to or less than the predetermined value, it is judged that a focus match has been achieved in the subject capturing AF area, before the operation proceeds to step S230. It is to be noted that if the focus detection is not possible (disabled image shift detection) in any of the subject capturing AF areas, the operation proceeds to step S230.

If it is decided that a focus match has not been achieved, the operation proceeds to step S220. In step S220, the defocus amount is transmitted to the lens drive control circuit 206 to enable the lens drive control circuit to drive the focusing lens 210 in the exchangeable lens 202 to the focus match position and then the operation proceeds to step S230. In step S230, image signals are read out from the imaging pixels at the image sensor, before the operation proceeds to step S240. In step S240, the image signals are saved into the memory card 219, before the operation returns to step S110 to repeatedly execute the operations described above.

Table 2 presents examples of positional arrangements that may be adopted in the digital camera for the focus detection sensor (exclusive AF) that executes focus detection through the image reformation method and for the image sensor (image sensor AF) that executes focus detection through the micro-lens method, in a format that facilitates comparison.

TABLE 2 positional arrangement examples for exclusive AF unit and image sensor AF unit and features of individual examples

| positional arrangement examples | features |
| --- | --- |
| (1) A fixed half mirror disposed in the light path of the imaging optical system, with the image sensor AF unit disposed on the reflection side of the fixed half mirror and the exclusive AF unit disposed on the transmission side of the fixed half mirror. | The mirror does not need to retreat, and thus high response is assured. Since reflected light is received at the image sensor AF unit, the image quality is not compromised. AF operation can be executed via the exclusive AF unit concurrently while photographing operation is in progress |
| (2) A fixed half mirror disposed in the light path of the imaging optical system, with the image sensor AF unit disposed on the transmission side of the fixed half mirror and the exclusive AF unit disposed on the reflection side of the fixed half mirror. | The mirror does not need to retreat, and thus high response is assured. The camera body can assume a low profile along the optical axis. AF operation can be executed via the exclusive AF unit concurrently while photographing operation is in progress. |
| (3) A movable total reflection mirror disposed in the light path of the imaging optical system, with the exclusive AF unit disposed on the reflection side of the movable total reflection mirror and the image sensor AF unit disposed at the image forming position where the image is formed in the imaging optical system while the movable mirror is in a off-path state. | Since no mirror is present in the light path during imaging operation, a high image quality is assured. Since the light flux is not split, better detection capability is assured at low brightness levels. |
| (4) An exclusive AF unit (outside light AF unit) provided separately from the imaging optical system and an image sensor AF unit disposed at the image forming position at which the image is formed via the imaging optical system. | The mirror does not need to retreat, and thus high response is assured Since no mirror is present in the light path during imaging operation, a high image quality is assured. Since the light flux is not split, better detection capability is assured at low brightness levels. AF operation can be executed via the exclusive AF unit concurrently while photographing operation is in progress. |

The positional arrangement shown in FIG. 1 is summarized as positional arrangement example (1). In this example, a fixed half mirror is disposed in the light path of the imaging optical system, the image sensor AF unit is disposed on the reflection side of the half mirror, and the exclusive AF unit is disposed on the transmission side of the half mirror. The positional example is characterized in that since the half mirror is fixed, it does not need to retreat when capturing an image. This means that the imaging operation can be executed with a minimum release time lag. In addition, since the image is captured at the image sensor by using the light reflected at the half mirror instead of the light transmitted through the glass constituting the half mirror, the quality of the image is not lowered. Furthermore, the exclusive AF unit can be engaged in operation to execute focus adjustment concurrently while an imaging operation is in progress at the image sensor.

Figure 18:
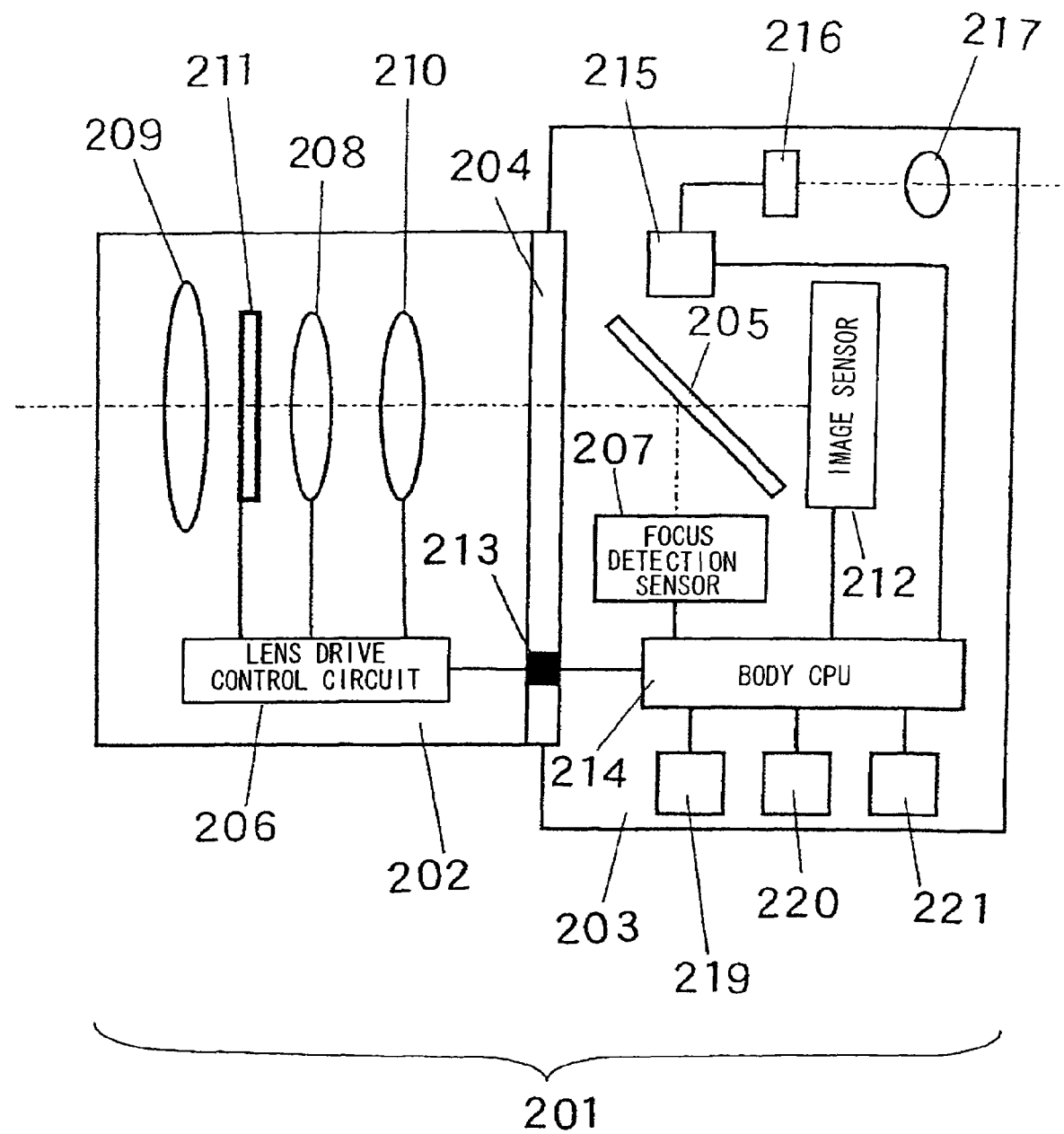
FIG. 18 presents another positional arrangement example that may be adopted in conjunction with the focus detection sensor (exclusive AF) and the image sensor (image sensor AF)

The positional arrangement shown in FIG. 18 is summarized as positional arrangement example (2). In this example, a fixed half mirror is disposed in the light path of the imaging optical system, with the exclusive AF unit disposed on the reflection side of the half mirror and the image sensor AF unit disposed on the transmission side of the half mirror. Namely, the positions of the exclusive AF unit and the image sensor AF are reversed from those in positional arrangement example (1).

An explanation is given in reference to FIG. 18 with the same reference numerals assigned to components identical to those shown in FIG. 1. The positional arrangement in FIG. 18 is characterized in that the fixed half mirror does not need to retreat when capturing an image and thus, the imaging operation can be executed with a minimum release time lag. In addition, since the image sensor is disposed along the optical axis, the camera body 203 is allowed to assume a smaller thickness measured along the optical axis, which in turn, makes it possible to provide a compact camera body 203. Furthermore, the exclusive AF unit can be engaged in operation to execute focus adjustment concurrently while an imaging operation is in progress at the image sensor.

Figure 19:
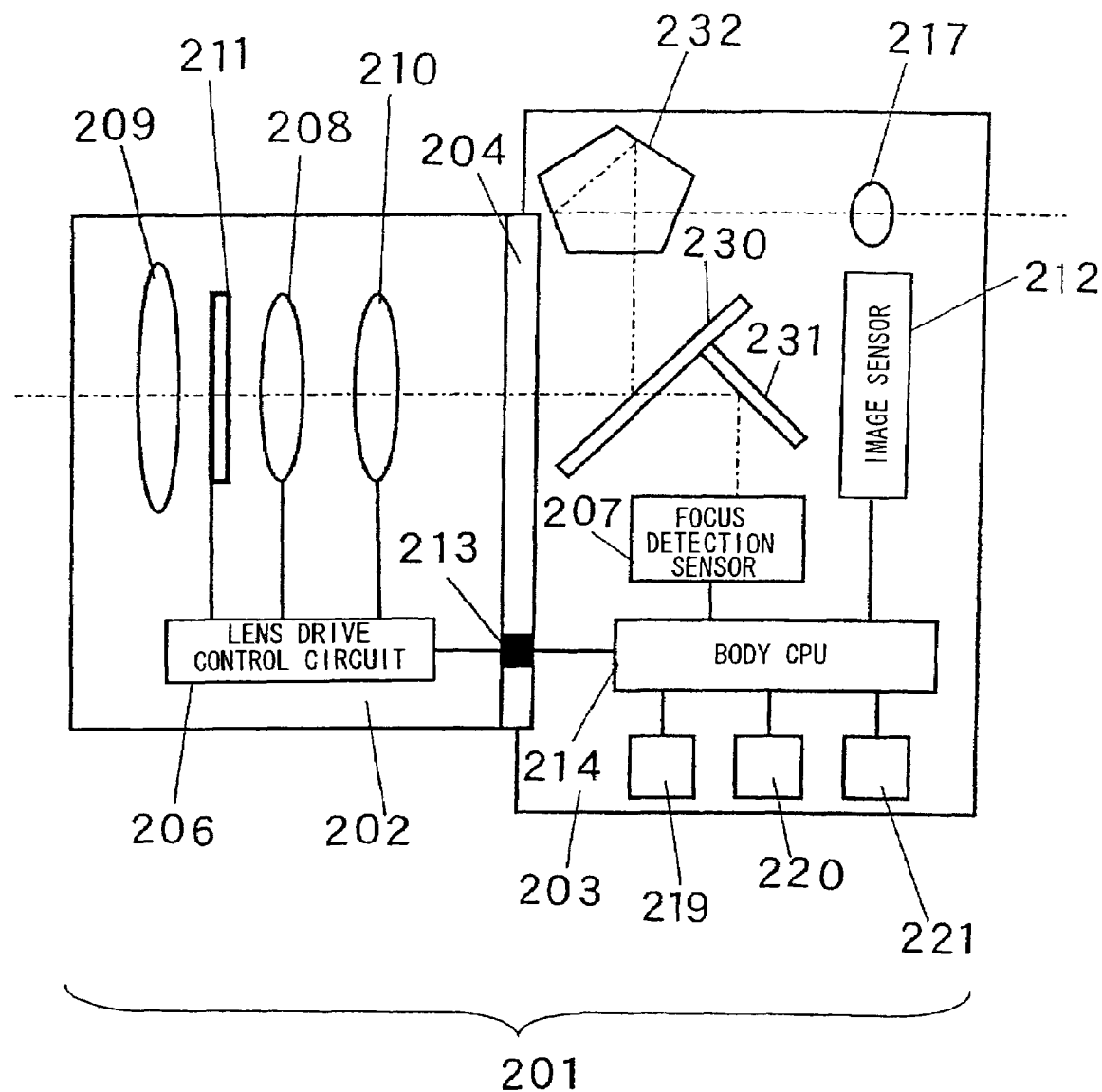
FIG. 19 presents yet another positional arrangement example that may be adopted in conjunction with the focus detection sensor (exclusive AF) and the image sensor (image sensor AF)

The positional arrangement shown in FIG. 19 is summarized as positional arrangement example (3). In this example, a main mirror 230 (movable half mirror) is disposed in the light path of the imaging optical system and reflected light is guided to an optical viewfinder disposed in the light path on the reflection side and constituted with a pentaprism 232 and the eyepiece lens 217. The explanation provided below focuses on the differences with the same reference numerals assigned to components in FIG. 19 identical to those shown in FIG. 1 so as to eliminate a repeated explanation thereof.

A light flux having been transmitted through the main mirror 230 is reflected at a sub mirror 231 (movable total reflection mirror) disposed to the rear of the main mirror, the reflected light is then guided to the focus detection exclusive sensor 207 used exclusively for focus detection positioned outside the imaging light path, and focus detection is executed at the focus detection exclusive sensor 207. In response to an imaging instruction, the main mirror 230 and the sub mirror 231 retreat from the imaging light path to allow the image sensor to receive the light flux, thereby enabling focus detection and imaging operation at the image sensor. This positional arrangement example is characterized in that since the mirrors retreat from the imaging light path when capturing an image to allow the image sensor to directly receive the imaging light flux, a high quality image can be obtained. In addition, since the light flux is not divided into a light flux for the exclusive AF and for the image sensor AF, the structure assures a sufficient light quantity with better ease even when the brightness is low.

Figure 20:
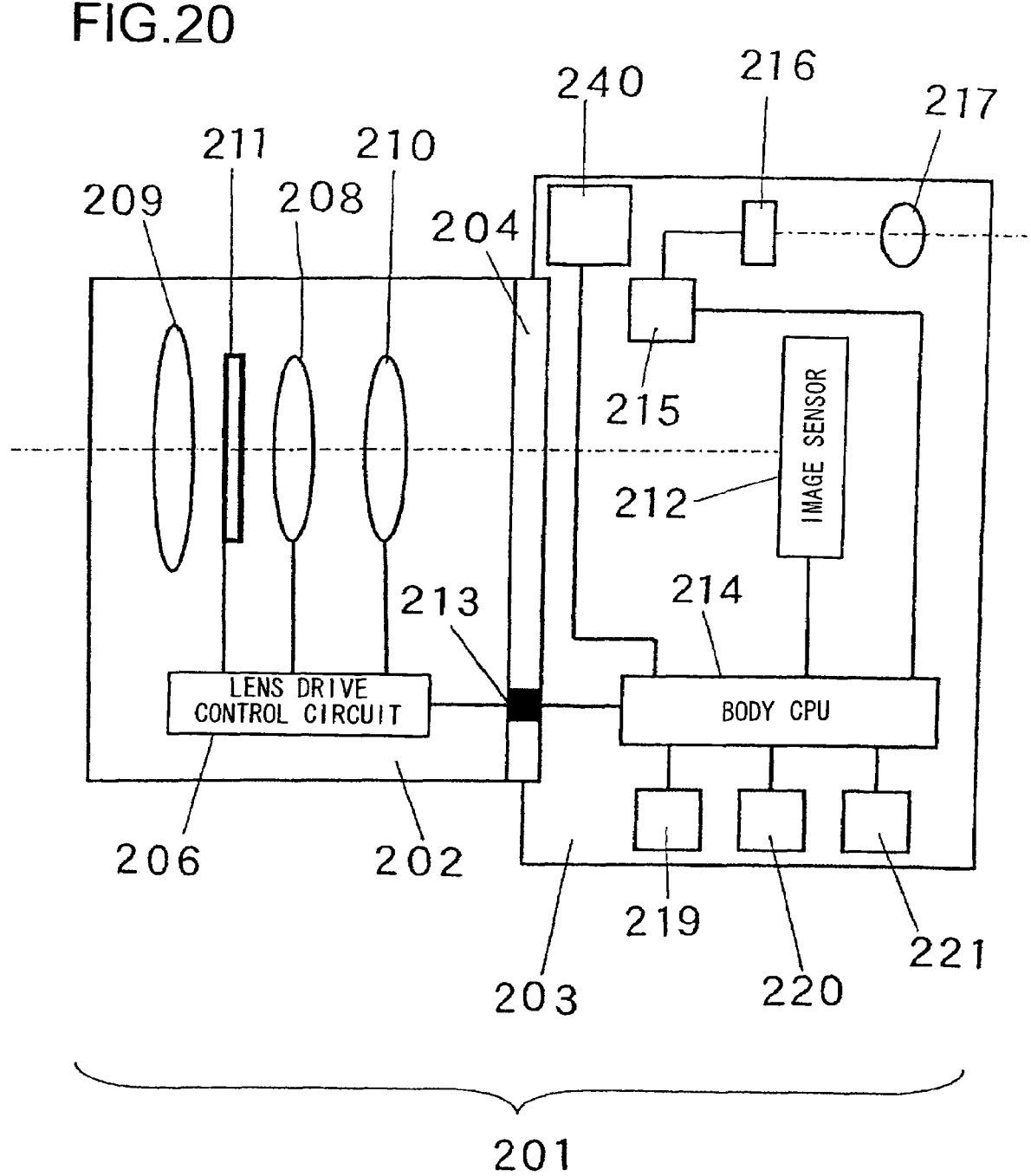
FIG. 20 presents yet another positional arrangement example that may be adopted in conjunction with the focus detection sensor (exclusive AF) and the image sensor (image sensor AF).

The positional arrangement shown in FIG. 20 is summarized as positional arrangement example (4). In this example, a range-finding device 240 that uses outside light (e.g., a reflected light receiving active AF unit, an image shift detection-type passive AF unit or an active AF unit adopting the "time of flight" method that utilizes ultrasound waves or light waves) is utilized as the exclusive AF unit. An explanation is now given in reference to FIG. 20, with the same reference numerals assigned to components identical to those shown in FIG. 1. The image sensor AF unit 212 receives the light flux from the exchangeable lens 202 at all times.

In the structure shown in FIG. 20, focus adjustment is executed by engaging the exclusive AF unit in operation prior to a shutter release and once a shutter release occurs, an image is captured after executing a focus adjustment via the image sensor AF unit. This makes it possible to execute focus detection even when the brightness is low, when defocusing manifests to a large extent or when the focus detection needs to be executed over multiple AF areas. At the same time, the structure assures a highly accurate focus match during an imaging operation. This positional arrangement example is characterized in that since the structure does not require the half mirror to retreat when capturing an image, the imaging operation can be executed with a minimum shutter release time lag. In addition, a high-quality image can be obtained with the imaging light flux directly received at the image sensor without any redundant optical elements disposed in the imaging light path. Furthermore, since the light flux does not need to be split, a sufficient quantity of light can be secured even when the brightness is low. Also, the exclusive AF unit can be engaged in operation to execute focus adjustment concurrently while an imaging operation is in progress at the image sensor.

Table 3 provides a list of specification for the exclusive AF unit and the image sensor AF, adopting a format that facilitates comparison.

TABLE 3

| specification description | exclusive AF | image sensor AF |
|---|---|---|
| range-finding pupil distance (1) | large | small |
| range-finding pupil distance (2) | matched | matched |
| range-finding pupil f-number (1) | dark | bright |
| range-finding pupil f-number (2) | matched | matched |
| range-finding pupil f-number (3) | bright | dark |
| range-finding pupil gravitational center interval (1) | small | large |
| range-finding pupil gravitational center interval (2) | matched | matched |
| AF area positions (1) | matched | matched |
| AF area positions (2) | varied | varied |
| AF area quantity (1) | matched | matched |
| AF area quantity (2) | large | small |
| detection pitch (1) | large (large) | fine (small) |
| detection pitch 2 | matched | matched |
| AF area length (1) | large | small |
| AF area length (2) | matched | matched |
| AF area width (1) | large | small |
| AF area width (2) | matched | matched |
| color separation filters (1) | not included | not included |
| color separation filters (2) | not included | included |
| infrared clip wavelength (1) | matched | matched |
| infrared clip wavelength (2) | matched to auxiliary light wavelength | adjusted in correspondence to imaging pixel characteristics | specification settings for exclusive AF and image sensor AF

By selecting the optimal settings for the individual specification categories with the statuses of use of the exclusive AF unit (image reformation method) and the image sensor AF unit (micro-lens Method) taken into consideration, focus adjustment achieving good overall balance can be executed.

With regard to the "range-finding pupil distance (1)", the exit pupil distance of a lens with a long focus, which tends to manifest a great defocus amount under normal circumstances, is large. Since the eclipse of the focus detection light fluxes can be prevented more effectively by matching the exit pupil distance of the exchangeable lens with the range-finding pupil distance, a large range-finding pupil distance is selected for the exclusive AF unit so as to give priority to the detection of defocusing occurring to a large extent. The range-finding pupil distance is set to a small value for the image sensor AF unit so as to enable focus detection for a lens with a short focus which tends to manifest defocusing to a lesser extent. With regard to the "range-finding pupil distance (2)", a higher level of uniformity can be assured for the extent to which the difference between the range-finding pupil distance set for the exclusive AF unit and the range-finding pupil distance set for the image sensor AF affects the focus detection results (the extent to which the focus detection accuracy is adversely effected by the eclipse of the focus detection light fluxes) by matching the range-finding pupil distances selected for the exclusive AF unit and the image sensor AF unit with each other. By matching the range-finding pupil distances, similar results are obtained regardless of which AF unit adopting one of the two different methods is used.

With regard to the "range-finding pupil f-number (1)", the range-finding pupil f-number is raised for the exclusive AF unit to achieve a darker setting so as to enable focus detection for a dark lens with a large minimum f-number and enable detection of defocusing manifesting to a large extent. A smaller range-finding pupil f-number is selected for the image sensor AF unit for a brighter setting to enable highly accurate focus detection for a light lens with a small minimum f-number and optimize the image sensor AF unit for detection of defocusing manifesting only to a small extent near the focus match point.

In addition, with regard to the "range-finding pupil f-number (2)", a higher level of uniformity can be assured for the extent to which the difference between the range-finding pupil minimum f-numbers selected for the exclusive AF unit and the image sensor AF affects the focus detection results (the extent to which the focus detection accuracy is adversely affected by the eclipse of the focus detection light fluxes) by selecting matching range-finding pupil f-numbers for the exclusive AF unit and the image sensor AF unit, when the distance from the optical axis of the exchangeable lens 202 to the focus detection positions used for the exclusive AF and the distance from the optical axis of the exchangeable lens 202 to the focus detection positions used for the image sensor AF are equal to each other in the imaging plane 100. By selecting such matching range-finding pupil f-numbers, similar results can be obtained regardless of which AF unit adopting one of the two different methods is utilized.

With regard to the "range-finding pupil f-number (3)", a small range-finding pupil f-number is selected for the exclusive AF unit for a brighter setting so as to improve the detection capability at low brightness levels. A larger range-finding pupil f-number is selected for the image sensor AF unit for a darker setting so as to optimize the image sensor AF for the focus detection executed at extremely high brightness levels (optimize the image sensor AF for control executed in conjunction with an extremely short charge storage period).

With regard to the "range-finding pupil gravitational center interval (1)", the range-finding pupil gravitational center interval (opening angle) is set to a small value for the exclusive AF unit so as to enable detection of defocusing occurring to a large extent, whereas a large range-finding pupil gravitational center interval (opening angle) is selected for the image sensor AF unit so as to assure a highly accurate focus detection near the focus match point. In addition, with regard to the "range-finding pupil gravitational center interval (2)", a higher level of uniformity is assured for the extent to which the difference between the range-finding pupil gravitational center intervals (opening angles) affects the focus detection results, by matching the range-finding pupil gravitational center interval (opening angle) for the exclusive AF unit with the range-finding pupil gravitational center interval (opening angle) for the image sensor AF unit. This, in turn, assures similar results to be obtained regardless of which AF unit adopting one of the two different methods is utilized.

With regard to the "AF area positions (1)", the AF areas are set at matching positions for the exclusive AF and the image sensor AF so as to allow either of the two different methods, better suited to the current conditions, to be selected when executing focus detection over the same AF areas. With regard to the "AF area positions (2)", the AF areas for the exclusive AF and the AF areas for the image sensor AF are set at positions different from each other to provide a greater number of AF areas within the imaging plane 100. For instance, AF areas may be set densely around the center of the imaging plane 100 in correspondence to the image sensor AF unit and AF areas may be set more sparsely over the periphery of the imaging plane 100 in correspondence to the exclusive AF unit.

With regard to the "AF area quantity (1)", the AF areas for the exclusive AF and the AF areas for the image sensor AF are set at matching positions in matching quantities so as to allow either of the two different methods, better suited to the current conditions, to be selected for all the AF areas. With regard to the "AF area quantity (2)", a greater number of AF areas is set in correspondence to the exclusive AF so as to dedicate the exclusive AF unit for focus detection in multiple AF areas, whereas a smaller number of AF areas is set in conjunction with the image sensor AF so as to dedicate the image sensor AF unit to high accuracy focus detection in a single AF area.

With regard to the "detection pitch (1)", a larger detection pitch (sampling pitch) is selected for the exclusive AF so as to ensure that the number of sets of data does not increase even when the AF areas assume a significant length to enable detection of defocusing occurring to a great extent, which, in turn, prevents an increase in the length of time required for the arithmetic operation and thus prevents the response from becoming poorer. For the image sensor AF, on the other hand, a fine detection pitch is selected so as to enable highly accurate image shift detection. With regard to the "detection pitch (2)", matching detection pitches are selected for the exclusive AF and the image sensor AF so as to assure a higher level of uniformity for the extent to which the difference between the detection pitches affects the focus detection results (an error in the image shift detection, the selectability of the subject pattern and the like). This, in turn, assures similar results to be obtained regardless of which AF unit, adopting one of the two different methods, is utilized.

With regard to the "AF area length (1)", the AF areas set in conjunction with the exclusive AF assume a greater length so as to assure a sufficient image shift range for the detection of defocusing manifesting to a great extent and also assure a higher level of reliability in capturing the subject. The AF areas set in conjunction with the image sensor AF, on the other hand, assume a smaller length so as to optimize the image sensor AF for focus detection near the focus match point where the image shift manifests only to a small extent and also to enable pinpoint focus detection. With regard to the "AF area length (2)", the AF areas set in conjunction with the exclusive AF and the image sensor AF assume matching lengths so as to achieve a higher level of uniformity for the extent to which the difference between the AF area lengths affects the focus detection results (an error in the image shift detection, the selectability of the subject pattern and the like).

This, in turn, assures similar results to be obtained regardless of which AF unit, adopting one of the two different methods, is utilized.

With regard to the "AF area width (1)", a greater AF area width is selected for the exclusive AF to assure a sufficient quantity of light even when the brightness is low, whereas a smaller AF area width is selected for the image sensor AF to enable detection of a finer subject pattern. With regard to the "AF area width (2)", the AF areas corresponding to the exclusive AF and the AF areas corresponding to the image sensor AF assume matching widths so as to assure a higher level of uniformity for the extent to which the AF area width difference affects the focus detection results (an error in the image shift detection, the selectability of the subject pattern and the like). This, in turn, assures similar results to be obtained regardless of which AF unit, adopting one of the two different methods, is utilized.

With regard to the "color separation filters (1)", no color separation filters are used either in conjunction with the exclusive AF or in conjunction with the image sensor AF, so as to eliminate any effect that color separation filters might have on the focus detection results (the selectability of the subject pattern and the like). This, in turn, assures similar results to be obtained regardless of which AF unit, adopting one of the two different methods, is utilized.

With regard to the "color separation filters (2)", no color separation filters (R, G and B color filters) are disposed at the photoelectric conversion units in the exclusive AF unit in order to assure a sufficient quantity of light even when the brightness is low. Color separation filters are, however, disposed at the focus detection pixels in the image sensor AF unit so as to improve the image quality by using the outputs from the focus detection pixels equipped with the color filters as well when interpolating image signals at the focus detection pixel positions with the outputs from the surrounding imaging pixels and also to enable focus detection for a subject that manifests a change in hue but does not manifest any change in brightness by executing the focus detection in correspondence to each color.

With regard to the "infrared clip wavelength (1)", the infrared clipping filters installed on the entry sides of the exclusive AF unit and the image sensor AF unit are both set to clip the infrared light with matching wavelengths, so as to eliminate the effect (infrared aberration) of the infrared component contained in the light flux traveling from the subject on the focus detection results. This, in turn, assures similar results to be obtained regardless of which AF unit, adopting one of the two different methods, is utilized.

With regard to the "infrared clip wavelength (2)", the infrared clip wavelength for the infrared clipping filter installed on the entry side of the exclusive AF unit is set so as to clip light containing AF auxiliary light and thus assure a desired level of focus detection performance even when the brightness is low. The infrared clip wavelength for the infrared clipping filter installed on the entry side of the image sensor AF unit, on the other hand, is set in correspondence to the infrared clipping characteristics of the imaging pixels so as to prevent an error attributable to the infrared aberration and to allow the outputs from the focus detection pixels to be used as image signals as well. It is to be noted that the term "AF auxiliary light" refers to light radiated onto the subject to increase the quantity of light when the brightness is low, and light with a large wavelength (red to infrared) with significant light emission energy is used as the AF auxiliary light.

Figure 17:
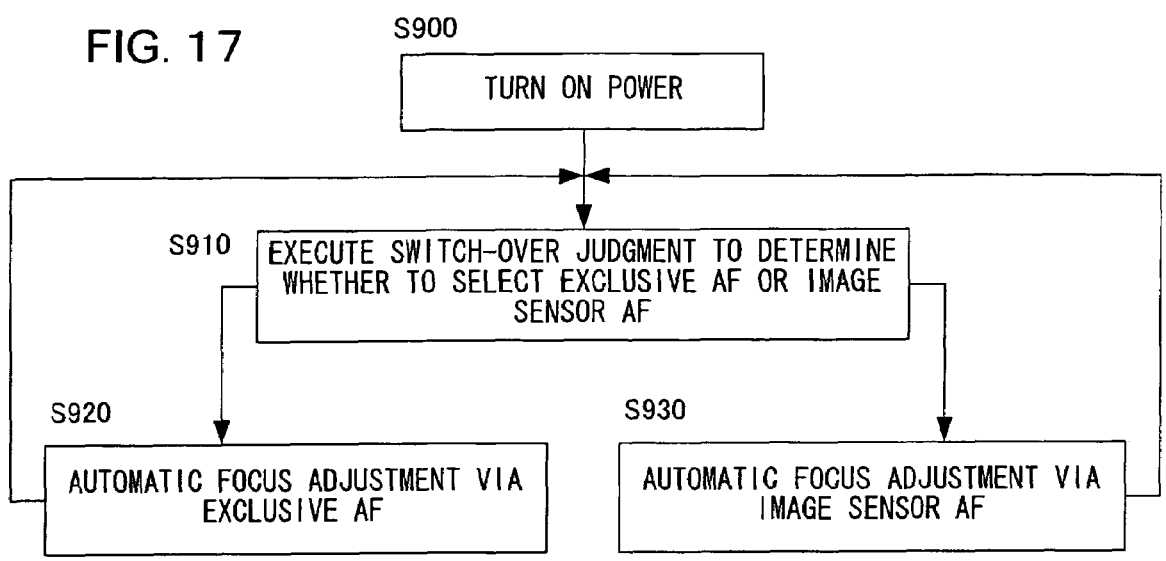
FIG. 17 presents a flowchart of the focus detection operation.

FIG. 17 presents a flowchart of the focus detection operation. In the flowchart presented in FIG. 12, the exclusive AF unit is engaged in operation for large focus adjustment and the image sensor AF unit is engaged in operation for fine focus adjustment. The procedure of the focus detection is now explained in reference to the flowchart presented in FIG. 17.

After the power is turned on in step S900, the operation proceeds to step S910. In step S910, a decision is made with regard to whether the exclusive AF or the image sensor AF should be selected in correspondence to the current conditions. If it is decided that the exclusive AF unit is to be utilized, the operation proceeds to step S920 to execute focus adjustment via the exclusive AF unit, before the operation returns to step S910. If, on the other hand, it is decided in step S910 that the image sensor AF unit is to be utilized, the operation proceeds to step S930 to execute focus adjustment via the image sensor AF unit, before the operation returns to step S910.

The decision with regard to the AF selection is made in step S910 so as to optimize the overall focus adjustment operation in the imaging device. Namely, the decision is made so as to select either the exclusive AF or the image sensor AF to take full advantage of the strengths of the image reformation method and the micro-lens method adopted in conjunction with the exclusive AF and the image sensor AF. For instance, the switch-over should be executed based upon the judging criteria (judging conditions) presented in Table 4.

TABLE 4 switch-over judging for switching to exclusive AF or image sensor AF

| judging criteria | exclusive AF | image sensor AF |
|---|---|---|
| shutter release instruction | shutter release instruction not issued | shutter release instruction issued |
| defocus amount | large | small |
| continuous shooting/single image shooting (1) | continuous shooting in progress | single image shooting in progress |
| continuous shooting/single image shooting (2) | single image shooting in progress | continuous shooting in progress |
| movie shooting/still image shooting (1) | movie shooting | still image shooting |
| movie shooting/still image shooting (2) | still image shooting | movie shooting |
| brightness | low | high |
| moving/stationary photographic subject | moving subject | stationary subject |
| AF area mode | multiple AF areas | single AF area |
| AF area positions (1) | periphery | center |
| AF area positions (2) | arbitrary setting | arbitrary setting |
| AF mode | continuous AF | one-shot AF |
| use of auxiliary light | auxiliary light used | auxiliary light not used |
| AF/MF | AF | MF |
| display | display in reduced size | display in enlarged size |
| lens minimum f-number | dark | bright |
| lens focal length | large | small |
| control f-number | dark | bright |
| shutter speed | high | low |
| sensitivity setting | high | low |
| strobe photographing | strobe photographing operation | non-strobe photographing operation |
| self timer photographing | non-self timer photographing operation | self timer photographing operation |

TABLE 4-continued switch-over judging for switching to exclusive AF or image sensor AF

| judging criteria | exclusive AF | image sensor AF |
| --- | --- | --- |
| hand-held/fixed photographing photographing mode | hand-held photographing sports mode | fixed photographing portrait mode |

By switching from the exclusive AF (image reformation method) to the image sensor AF (micro-lens method) and vice versa in an optimal manner with the conditions under which the imaging device is currently utilized taken into consideration, focus adjustment achieving a good overall balance can be executed.

With regard to the "shutter release (imaging command) yes/no criterion", the exclusive AF is selected before a shutter release operation is performed at the shutter button, since the following requirements should be satisfied prior to the shutter release operation.
(1) Focus adjustment must be executed for a subject that has become significantly blurred due to a change in the image composition or the like.
(2) Focus adjustment should be executed for an object most likely to be the photographic subject when a plurality of objects are present within the imaging plane 100.
(3) Focus adjustment should be executed by giving priority to good response rather than accuracy.
(4) Focus adjustment should be enabled even when the brightness is low.

After the shutter release operation is performed at the shutter button, however, it becomes more important to achieve a highly accurate focus adjustment immediately before capturing the image and, accordingly, the image sensor AF unit is engaged —Defocus Quantity—

When defocusing manifests to a great extent, the exclusive AF unit capable of detecting a large defocus amount is engaged in operation to execute the focus adjustment by driving the lens to a point near the focus match position. As the lens is driven to the point near the focus match position and thus the extent of defocusing becomes reduced, the image sensor AF unit capable of highly accurate focus adjustment is selected.

—Continuous Shooting and Single Image Shooting (1)—

When the imaging device is engaged in a continuous shooting (during which images are captured successively with short intervals), it is likely that the subject is moving and, accordingly, the exclusive AF unit capable of high-response focus adjustment for a moving subject is engaged. During a single image photographing operation (during which a single image is captured in response to a single shutter release operation), the photographic subject is likely to be stationary and, for this reason, the image sensor AF unit capable of highly accurate focus adjustment for a stationary photographic subject is engaged.

—Continuous Shooting and Single Image Shooting (2)—

When the system represented by example (3) in Table 2 is utilized, engagement of the exclusive AF unit necessitates the mirror to enter the light path and retreat from the light path to enable the focus detection operation and the imaging operation respectively, which disallows high-speed continuous shooting operation. Accordingly, the image sensor AF unit, which does not require any displacement of the mirror for the focus detection or the imaging operation, is used for the continuous shooting operation, whereas the exclusive AF unit, more effective in focus detection executed at low brightness or in detection of defocusing occurring to a large extent, is engaged for single image photographing operation.

—Movie Shooting and Still Image Shooting (1)—

When the imaging device is engaged in a movie shooting (video photographing) operation or when the imaging device is set in a movie shooting mode, the object being photographed is likely to be moving. Accordingly, the exclusive AF unit capable of high-response focus adjustment for a moving subject is engaged in operation. When the imaging device is currently engaged in a still image shooting operation (still photographing operation) or if the imaging device is currently set in the still shooting mode, the object being photographed is likely to be still and, accordingly, the image sensor AF unit capable of highly accurate focus detection for a still photographic subject is engaged.

—Movie Shooting and Still Image Shooting (2)—

When the system represented by example (3) in Table 2 is utilized, engagement of the exclusive AF unit necessitates the mirror to enter the light path and retreat from the light path to enable the focus detection operation and the imaging operation respectively, and thus, movie shooting cannot be executed. Accordingly, the image sensor AF unit, which does not require any displacement of the mirror, is used for movie shooting (video photographing) or when the imaging device is set in a movie shooting mode. While a still image shooting (still photographing) is in progress or when the imaging device is set in the still shooting mode, on the other hand, the exclusive AF unit, more effective in focus adjustment at low brightness levels or in detection of defocusing occurring to a large extent, is engaged.

—Brightness—

When the brightness in the photographic field is lower than a predetermined value, the exclusive AF unit, more effective in focus adjustment executed at low brightness levels, is engaged in operation, whereas when the brightness level is higher than the predetermined value, the image sensor AF unit capable of highly accurate focus adjustment is engaged in operation. It is to be noted that the brightness in the photographic field is determined through an arithmetic operation executed by the CPU 214 based upon the output from the image sensor 212. Alternatively, the brightness in the photographic field may be detected via a dedicated photometering element and a dedicated photometering circuit specifically installed for such purposes.

—Moving Photographic Subject or Stationary Photographic Subject—

Based upon any change discerned in the focus detection results (defocus amount) over time, the subject can be judged to be moving or in a stationary state. If the photographic subject is judged to be moving, the exclusive AF unit capable of high-response focus adjustment for a moving photographic subject is engaged in operation. If, on the other hand, the subject is judged to be stationary, the image sensor AF unit capable of highly accurate focus adjustment for a stationary photographic subject is engaged.

—AF Area Mode—

If a multi-AF area mode for executing focus detection simultaneously at a plurality of focus detection positions has been selected via an AF area mode selection operation member (not shown), the exclusive AF unit with which focus detection can be executed with ease simultaneously at a plurality of focus detection positions and high-response focus adjustment can be executed is engaged in operation. If, on the other hand, a single AF area mode for executing focus detection at a single focus detection position has been selected, the image sensor AF unit capable of highly accurate focus adjustment is engaged in operation.

—AF Area Positions (1)—

When the AF areas set in the periphery of the imaging plane 100 are selected, an image with a very high image quality is not likely to be obtained over the image plane periphery due to the aberration of the lens. Accordingly, the exclusive AF unit is selected under such circumstances by giving higher priority to the response rather than the focus adjustment accuracy. If, on the other hand, an AF area set at the center of the image plane has been selected, the image sensor AF unit capable of highly accurate focus adjustment is selected so as to maximize the image quality.

—AF Area Positions (2)—

When the AF areas used for the exclusive AF and the AF areas used for the image sensor AF are set at different positions, the AF operation is executed through the AF method (the exclusive AF or the image sensor AF) adopted in the AF area present at a position closest to the position within the imaging plane 100 specified by the user.

—AF Mode—

If a continuous AF mode for continuously executing the focus adjustment operation after the imaging optical system is in focus has been selected via an AF mode selecting operation member (not shown) so as to sustain the focus match on a moving subject, the exclusive AF unit is engaged, since the exclusive AF unit has a high level of focus adjustment performance in conjunction with a moving photographic subject and is also capable of high-response focus adjustment. If, on the other hand, a one-shot AF mode for executing stable and reliable focus detection for a stationary photographic subject has been selected by locking the focus adjustment operation once the imaging optical system is in focus, the image sensor AF unit capable of highly accurate focus adjustment is engaged.

—Use of AF Auxiliary Light—

When the brightness is low and focus detection needs to be executed by radiating AF auxiliary light on to the subject, the exclusive AF unit, more effective in the focus adjustment at low brightness levels is engaged in operation. If, on the other hand, the focus detection can be executed without having to radiate any AF auxiliary light, the image sensor AF unit capable of highly accurate focus adjustment is engaged.

—AF and MF—

If an AF mode (autofocus) for automatically adjusting the focus by driving the lens based upon the focus detection results has been selected, the exclusive AF unit capable of high-response focus adjustment for moving photographic subjects is engaged in operation. If, on the other hand, an MF mode (manual focus; auto focus disallowed) for indicating the focus condition based upon the focus detection results provided by the exclusive AF unit to allow the user to manually adjust the focus of the lens in correspondence to the indicated focus condition has been selected, the image sensor AF unit capable of highly accurate focus detection over the critical range is engaged in operation.

—Display—

If a magnification factor for an image display in a reduced size has been selected when displaying an image on the electronic viewfinder concurrently while the focus adjustment operation is in progress (in any of the systems corresponding to examples 1, 2 and 4 in Table 2), the exclusive AF unit is engaged in operation so as to give higher priority to better response in the focus adjustment operation. If, on the other hand, a magnification factor for an image display in an enlarged size has been selected, the image sensor AF unit is engaged so as to give higher priority to the focus matching accuracy. It is to be noted that an operation member via which a specific image display magnification factor can be selected should be included in the system so as to allow the user to select a display magnification factor for an image display in an enlarged size or in a reduced size.

—Minimum f-number—

If the minimum f-number (maximum aperture) of the exchangeable lens mounted at the imaging device indicates a low brightness level, the exclusive AF unit which the darker range-finding pupil f-number is engaged in operation in order to ensure that the focus detection accuracy is not lowered due to an eclipse of the focus detection light flux. If, on the other hand, the minimum f-number of the exchangeable lens mounted on the imaging device indicates a high light level, the image sensor AF unit with the light range-finding pupil f-number, which is capable of executing highly accurate focus detection, is engaged in operation. It is to be noted that information indicating the aperture minimum f-number of the exchangeable lens and the like is transmitted from the lens drive control circuit 206 to the body CPU 214.

—Lens Focal Length—

If the exchangeable lens mounted at the imaging device has a large focal length, the exclusive AF unit with a large range-finding pupil distance, which is capable of detecting the defocus amount over a wide range, is engaged in operation. If, on the other hand, the exchangeable lens mounted on the imaging device has a small focal length, the image sensor AF unit with a small range-finding pupil distance, which is capable of executing focus detection with high accuracy, is engaged in operation. It is to be noted that information indicating the focal length of the exchangeable lens and the like is transmitted from the lens drive control circuit 206 to the body CPU 214.

—Aperture Control F Value of the Exchangeable Lens—

If a large aperture f-number (control f-number) is to be used during the imaging operation, the focal depth is significant and thus, it is not necessary to assure a high level of focus adjustment accuracy. For this reason, the exclusive AF unit is engaged so as to give higher priority to better response in the focus adjustment operation. If, on the other hand, a small control f-number is obtained, the focus detection needs to be executed with a high level of accuracy and, for this reason, the image sensor AF unit is engaged. It is to be noted that the aperture control f-number in the exchangeable lens is determined through exposure control calculation executed in the body CPU 214.

—Shutter Speed—

When a high shutter speed (short exposure time) is set for the imaging operation, the photographic field is bound to be dark, and accordingly, the exclusive AF unit is engaged in order to assure good response in the focus adjustment operation. When a low shutter speed (long exposure time) is set for the imaging operation, the image sensor AF unit is engaged in operation so as to give higher priority to the focus adjustment accuracy. It is to be noted that the shutter speed is determined through the exposure control calculation executed in the CPU 214.

—Sensitivity—

When a high sensitivity level (a high amplification factor for the outputs from the imaging pixels at the image sensor) is selected for the imaging operation, the photographic field is bound to be dark and, accordingly, the exclusive AF unit is engaged in order to assure good response in the focus adjustment operation. When a low sensitivity level is selected for the imaging operation, the image sensor AF unit is engaged in operation so as to give higher priority to the focus adjustment accuracy. It is to be noted that the sensitivity is selected via a sensitivity setting operation member (not shown) and the amplification factor corresponding to the sensitivity having been set is selected for the outputs from the imaging pixels at the image sensor.

—Use of Strobe (Subject Illumination)—

The exclusive AF unit, more effective in focus adjustment at low brightness levels, is engaged for strobe photographing operation during which an image of the subject is captured by radiating illuminating light onto the subject. However, when capturing an image without radiating illuminating light, the image sensor AF unit capable of highly accurate focus adjustment is engaged. In addition, if the strobe photographing operation is disallowed via a strobe photographing selection member used to select either the allow setting or the disallow setting for strobe photographing operation, the image sensor AF unit is utilized, whereas if the strobe photographing operation is allowed via the strobe photographing selection member, the exclusive AF unit is utilized.

—Self Timer Photographing—

When a self timer photographing mode for executing an imaging operation by first allowing a predetermined length of time to elapse after receiving an imaging instruction has been selected via a photographing mode selecting operation member (not shown), the photographic subject is likely to be a stationary subject, and accordingly, the image sensor AF unit capable of highly accurate focus adjustment is engaged. If, on the other hand, the self timer photographing mode has not been selected, the photographic subject is more likely to be a moving photographic subject, and accordingly, the exclusive AF unit more suited to focus adjustment for moving subjects is engaged.

—Hand-held Photographing or Fixed Photographing—

For a fixed photographing operation performed by using a tripod or the like, the photographic subject is likely to be a stationary subject, and, accordingly, the image sensor AF unit capable of highly accurate focus adjustment is engaged. The likelihood of the photographic subject of a hand-held photographing operation performed by holding the camera by hand being a moving subject is higher, and accordingly, the exclusive AF unit, more suited to focus adjustment for moving subjects, is engaged in conjunction with the hand-held photographing operation. It is to be noted that the decision as to whether or not the imaging device is in a fixed state can be made by detecting whether or not the camera is mounted on a tripod or based upon the output from an angular speed sensor or an acceleration sensor built into the imaging device.

—Photographing Mode—

The user is able to select a set of photographic conditions (the aperture value, the shutter speed and the sensitivity) for the imaging operation by selecting a specific photographing mode in correspondence to the photographic subject. For instance, if a sports mode suited to capturing an image of a moving photographic subject has been selected via the photographing mode selecting operation member (not shown), the exclusive AF unit ideal for focus adjustment for moving photographic subjects is engaged. If, on the other hand, a portrait mode suited to capturing an image of a stationary photographic subject has been selected, the image sensor AF unit capable of highly accurate focus adjustment is engaged.

Table 5 is a list of AF algorithm parameter settings at the exclusive AF unit and image sensor AF unit, presented in a format that facilitates comparison.

TABLE 5

AF algorithm parameter settings for exclusive AF and image sensor AF

| characteristics description | exclusive AF | image sensor AF |
|---|---|---|
| defocus amount detection range | large | small |
| disabled detection threshold value | less rigorous | more rigorous |
| focus match recognition range | wide | narrow |
| focus match area | automatic judgment | sustain judgment results provided via exclusive AF |
| offset amount | difference relative to image sensor AF | N/A |

While the same image shift detection algorithm (expressions (1) to (6) and the like) is used in conjunction with the exclusive AF and the image sensor AF, the level of the focus adjustment operation performance for the overall imaging device can be improved by selecting the optimal parameter settings.

—Defocus Quantity Detection Range—

The defocus amount detection range is determined based upon the image shift limits (p, q) indicated in expression (1). In conjunction with the exclusive AF, a smaller value is assumed for p and a larger value is assumed for q so as to enable detection over a wider range. Since the image sensor AF unit is engaged in focus adjustment in the range around the focus match point, a larger value is assumed for p and a smaller value is assumed for q to narrow the image shift range and, since this reduces the detection range, the length of time required for the arithmetic operation is reduced.

—Disabled Image Offset Detection Decision-Making Threshold Value—

The focus detection is judged to be unreliable if the minimum correlation quantity $C(x)$ expressed in (3) is equal to or greater than a threshold value. This threshold value is set to assume specific values so that more rigorous judging criteria are applied in the image sensor AF than for the exclusive AF. Namely, the threshold value assumes a greater value in conjunction with the exclusive AF than the value selected in conjunction with the image sensor AF. By selecting such values for the threshold value, the focus detection can be executed with an even higher level of accuracy. It is to be noted that since the value representing the minimum correlation quantity $C(x)$ is also dependent on the number of sets of data used in the correlational arithmetic operation, the value representing the minimum correlation quantity $C(x)$ is first standardized based upon the number of sets of data used in the correlational arithmetic operation before the value is used in the judging process. The focus detection is judged to be unreliable if the parameter SLOP expressed in (5) is equal to or less than a threshold value. This threshold value is set to assume specific values so that more rigorous judging criteria are applied in the image sensor AF than for the exclusive AF. By selecting such values for the threshold value, the focus detection can be executed with an even higher level of accuracy. It is to be noted that since the value representing the parameter SLOP is also dependent on the number of sets of data used in the correlational arithmetic operation, the value representing the parameter SLOP is first standardized based upon the number of sets of data used in the correlational arithmetic operation before the value is used in the judging process.

—Focus Match Verification Range—

The term "focus match verification range" refers to the defocus amount range over which a focus matched state is recognized in step S150 and step S210 in the flowchart presented in FIG. 12. A wider focus match verification range is set for the exclusive AF so as to allow the lens to be driven quickly to a position near the focus match point and set the imaging device in a shutter release ready state. However, a narrower focus match verification range is selected for the image sensor AF so as to achieve a highly accurate focus match during the imaging operation.

—Focus Match Area—

The term "focus match area" refers to the subject capturing area determined in step S140 in the flowchart presented in FIG. 12. The focus detection is executed over a plurality of AF areas through the exclusive AF better suited for simultaneous focus detection at multiple detection positions, at an early stage of the focus detection operation. Then, the plurality of defocus quantities obtained through the focus detection through the exclusive AF are arithmetically processed by using a specific algorithm to determine the AF area where the subject appears to be captured. The image sensor AF is not suited to focus detection executed simultaneously at a plurality of focus detection positions, is engaged to execute highly accurate focus detection in the AF area having been selected through the exclusive AF.

—Offset Amount—

Figure 14:
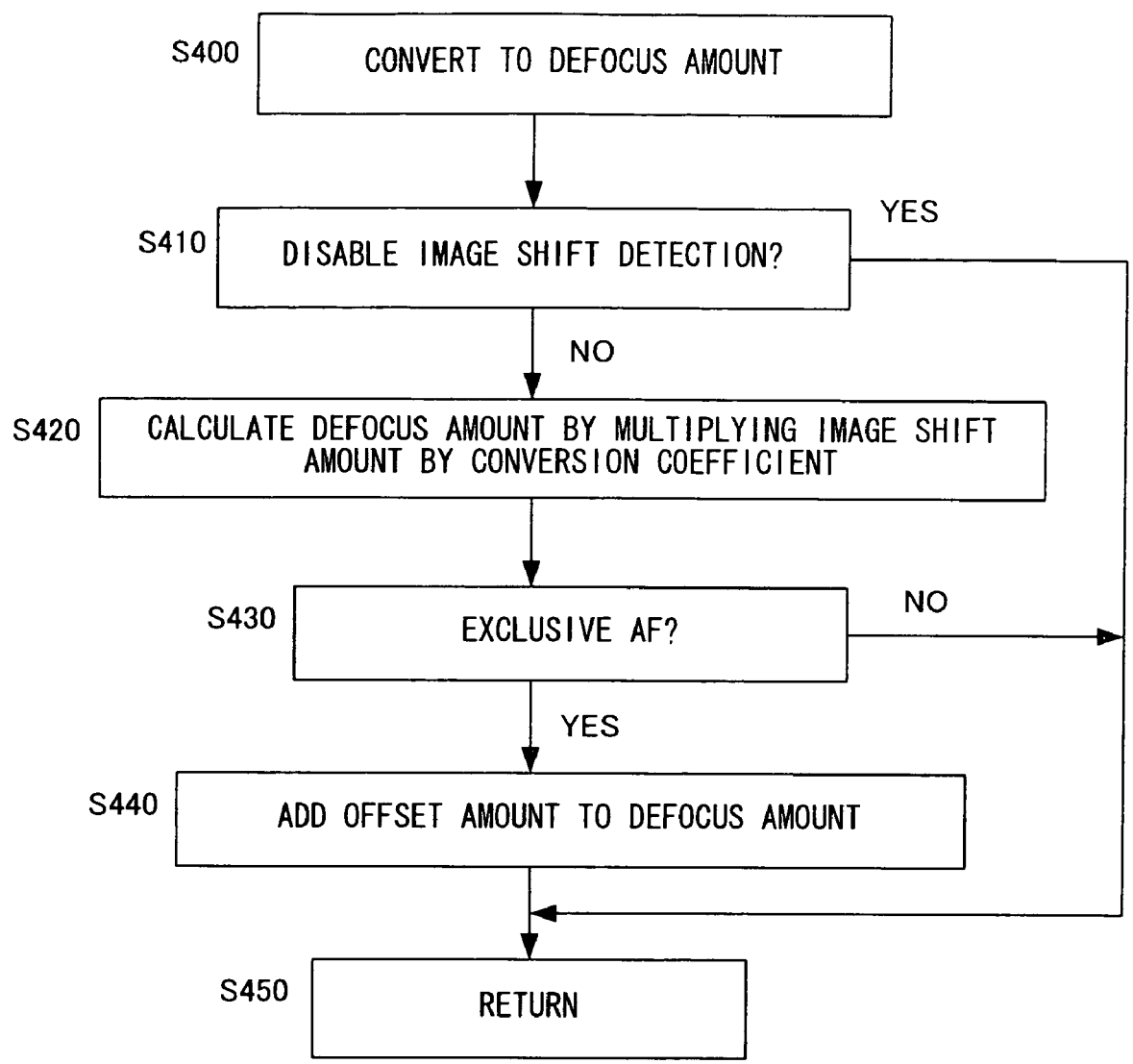
FIG. 14 presents a flowchart of the operation executed to convert the image shift amount to a defocus amount.

The term "offset amount" refers to the extent to which the calculated defocus amount is fine-adjusted as has been explained in reference to step S440 in FIG. 14. A defocus amount detected via the image sensor AF unit achieved by disposing focus detection pixels and imaging pixels on a single image sensor substrate directly corresponds to the state of focus adjustment in the image formed on the image sensor. Since the exclusive AF unit is built into the camera body as a unit independent of the image sensor, an offset amount needs to be incorporated into the defocus amount detected through the exclusive AF in order to ultimately achieve a focus match on the image sensor.

It is to be noted that if different range-finding F values are assumed for the image sensor AF and the exclusive AF, the focus match positions determined through the image sensor AF and the exclusive AF may change due to the optical characteristics (spherical aberration and the like) of the photographic optical system, which may ultimately alter the offset amount. Under such circumstances, the offset amount should be adjusted based upon the optical characteristics data included in the lens information.

Likewise, if the minimum f-number of the exchangeable lens is a greater than the range-finding f-number assumed for the image sensor AF or the exclusive AF, an eclipse of the focus detection light fluxes may occur to change the focus match positions determined through the image sensor AF and the exclusive AF, which may ultimately alter the offset amount as well. Under such circumstances, the offset amount should be adjusted based upon the minimum f-number indicated in the lens information.

In addition, focus detection may be executed simultaneously by engaging the exclusive AF unit and the image sensor AF unit for a given photographic subject on a regular basis, and the offset amount may be updated by using the difference between the defocus quantities most recently calculated through the exclusive AF and the image sensor AF. By updating the offset amount in this manner, the focus detection can be executed with reliable accuracy even when the positions of the image sensor AF unit and the exclusive AF unit change due to certain environmental conditions such as the humidity, the temperature and the like or even when their positions change over time due to mechanical wear and the like of movable members such as the sub mirror constituting the light flux switching means.

Table 5 indicates that different AF algorithm parameter settings are selected for the exclusive AF unit engaged during the early stage of the focus adjustment operation and for the image sensor AF unit engaged during the final stage of the focus adjustment operation, so as to achieve an optimal balance satisfying both the high response requirements and the high accuracy requirements in the overall focus adjustment operation. Matching settings should be selected for the parameters in Table 5 if different focus detection positions are assumed for the exclusive AF and the image sensor AF so that the focus detection performance does not greatly fluctuate no matter which focus detection position (AF area) is selected.

Further examples of variations are now explained. The half mirror shown in FIG. 1 or FIG. 18 may adopt a structure other than that achieved by forming a translucent film on a glass plate, as long as it constitutes a light splitting means for splitting light. For instance, it may be formed by bonding two triangular prism blocks at their inclined surfaces and forming a multi-layer film with a half mirror function at the attached surfaces. This structure effectively prevents reflection at the rear surface, which tends to occur readily when a glass plate is used and, as a result, the focus detection performance and the image quality are both improved. Alternatively, the half mirror may be constituted with a pellicle mirror disposed over a thin film. This structure, too, effectively prevents reflection at the rear surface, which tends to occur readily when a glass plate is used and, as a result, the focus detection performance and the image quality are both improved.

Moreover, instead of a mirror that quantitatively splits light, a spectroscopic mirror that divides light according to wavelength may be used. For instance, a spectroscopic mirror that directs visible light to be received at the image sensor AF unit and directs infrared light to be received at the exclusive AF unit may be utilized. In conjunction with such a mirror, a sufficient quantity of light to be used in the imaging operation can be assured with ease. Alternatively, a polarizing half mirror may be used in conjunction with a circular polarization filter at which incident light is received so as to selectively transmit or reflect part of the light having passed through the circular polarization filter, which has been polarized along a specific direction. The use of such a polarization half mirror prevents any wavelength-attributed fluctuation of the transmittance and the reflectance, which tends to occur readily when a half mirror constituted with a multilayer film is used.

The imaging and focus detection apparatus according to the present invention is not limited to a digital still camera constituted with an exchangeable lens and a camera body. The present invention may also be adopted in a digital still camera with an integrated lens or a video camera. It may also be adopted in a compact camera module or the like built into a device such as a portable telephone.

As explained above, the focus adjustment device in an embodiment comprises an image sensor that includes imaging pixels for capturing an image formed via an imaging optical system and focus detection pixels for detecting a focus adjustment state at the imaging optical system through a first pupil division-type image shift detection method, a focus detector that detects a focus adjustment state at the imaging optical system through a second pupil division-type image shift detection method different from the first pupil division-type image shift detection method, and a focus adjustment controller that executes focus adjustment for the imaging optical system based upon the focus adjustment states detected by the image sensor and the focus detector. As a result, high response and highly accurate focal point adjustment is realized.

The focus adjustment device in an embodiment comprises an image sensor that includes imaging pixels for capturing an image formed via an imaging optical system and focus detection pixels for detecting a focus adjustment state at the imaging optical system through a first processing process, a focus detector that detects a focus adjustment state at the imaging optical system through a second processing process different from the first processing process, and a focus adjustment controller that executes focus adjustment for the imaging optical system based upon the focus adjustment states detected by the image sensor and the focus detector. As a result, high response and highly accurate focal point adjustment is realized.

In addition, since both the image sensor and the focus detector adopt the pupil division-type focus detection method, no significant discrepancy occurs in the focus detection results and a smooth and natural switch-over between the focus detection via the image sensor and the focus detection via the focus detector is enabled. Since optimal structures of the pupil division-type focus detection and optimal settings for the various parameters of the pupil division-type focus detection algorithm can be selected in correspondence to the conditions under which the individual focus detection functions are engaged, settings that will allow the individual focus detection functions to complement each other can be selected, and by switching to the specific focus detection function to suit a specific set of conditions, the level of overall focus detection performance can be improved.

The focus adjustment device in an embodiment includes an optical element that splits the light path of the imaging optical system into a path extending toward the image sensor and a path extending toward the focus detector or switches from one path to the other. Via this optical element, either the first pupil division-type image shift detection method in the image sensor or the second pupil division-type image shift detection method in the focus detector can be selected to better suit the specific set of conditions under which the focus detection is executed. In addition, since the focus detection is executed based upon a single principle, no significant discrepancy occurs in the focus detection results and a smooth and natural switch-over between the focus detection via the image sensor and the focus detection via the focus detector is enabled.

In the focus detection device in an embodiment, imaging pixels and focus detection pixels are disposed on a single substrate, and the focus detection pixels each include a micro-lens and a pair of photoelectric conversion units provided in correspondence to the micro-lens. The image sensor, at which focus detection is executed by adopting the micro-lens method, can be provided as a compact unit. Furthermore, since the focus detection can be ultimately executed on a plane which exactly matches the imaging plane, highly accurate focus detection can be achieved by eliminating an error in the alignment of the image sensor and the focus detector and an error occurred with regard to the position of the image sensor itself.

In an embodiment, the focus adjustment for the imaging optical system is executed by initially executing focus adjustment for the imaging optical system based upon the detection results provided by the focus detector until the photographing operation starts and then by executing focus adjustment for the imaging optical system based upon the detection results provided by the image sensor once the photographing operation starts. This structure, which enables both high-response focus adjustment based upon the detection results provided by the focus detector and highly accurate focus adjustment based upon the detection results provided by the image sensor, makes it possible to quickly and accurately focus on a target subject.

The focus detection device in an embodiment comprises an image sensor that includes imaging pixels for capturing an image formed via an imaging optical system and focus detection pixels for detecting a defocus amount at the imaging optical system through a pupil division-type method, a focus detector that detects a focus adjustment state at the imaging optical system through a pupil division-type method, a focus adjustment controller that executes focus adjustment for the imaging optical system based upon the focus adjustment states detected by the image sensor and the focus detector, and a corrector that corrects the defocus amount detected by the focus detector by adding an offset thereto so as to equalize the defocus amount with the defocus amount detected by the image sensor. As a result, even if the image sensor and the focus detector is switched based upon the photographic condition and the like, the focus detection results are in agreement and a smooth and natural switch-over between the focus detection via the image sensor and the focus detection via the focus detector is enabled.

In the embodiment, the offset represents a difference between the defocus amount detected by the image sensor and the defocus amount detected by the focus detector in correspondence to a single photographic subject. As a result, the focus detection results between the image sensor and the focus detector are in agreement and a smooth and natural switch-over between the focus detection via the image sensor and the focus detection via the focus detector is enabled.

In the embodiment, since the offset is set in correspondence to optical characteristics of the imaging optical system, different focus states between the image sensor and the focus detector are not detected in different optical characteristics of the imaging optical system.

The focus detection device in an embodiment further comprises a storage device that stores the offset, and the focus adjustment controller updates the offset based upon the defocus quantities detected by the image sensor and the focus detector. As a result, the correct offset is obtained at all times.

What is claimed is:

1. An imaging device, comprising:
 a first image sensor that includes imaging pixels for capturing an image formed via an imaging optical system and focus detection pixels for detecting a focus adjustment state at the imaging optical system based upon a shift amount between a pair of images formed with light fluxes passing through a pair of areas on a pupil of the imaging optical system;
 a focus detector that detects a focus adjustment state at the imaging optical system based upon a shift amount between a pair of images formed with light fluxes passing through a pair of areas on a pupil of the imaging optical system;
 a focus adjustment controller that executes focus adjustment for the imaging optical system based upon the focus adjustment state detected by the first image sensor or the focus detector selected in correspondence to photographic conditions; and
 an optical element capable of directing a light flux from the imaging optical system along a light path extending toward the first image sensor and along a light path extending toward the focus detector, wherein:
the first image sensor includes the imaging pixels and the focus detection pixels disposed on a single substrate,
the focus detector includes a pair of re-focusing lenses for reforming an image formed at a predetermined image plane of the imaging optical system and a second image sensor that detects images reformed via the pair of re-focusing lenses, and
the focus adjustment controller executes focus adjustment for the imaging optical system based upon the focus adjustment state detected by the first image sensor while a movie shooting is in progress with the light flux from the imaging optical system directed along the light path extending toward the first image sensor.

2. An imaging device according to claim 1, wherein:
the focus detection pixels each include a micro-lens and a pair of photoelectric conversion units provided in correspondence to the micro-lens.

* * * * *